United States Patent [19]

Nakanishi et al.

[11] Patent Number: 5,191,384
[45] Date of Patent: Mar. 2, 1993

[54] DISTANCE MEASURING SYSTEM

[75] Inventors: Motohiro Nakanishi; Hiroshi Ootsuka, both of Osaka, Japan

[73] Assignee: Minolta Camera Kabushiki Kaisha, Osaka, Japan

[21] Appl. No.: 631,225

[22] Filed: Dec. 21, 1990

Related U.S. Application Data

[63] Continuation of Ser. No. 302,838, Jan. 27, 1989, abandoned.

[30] Foreign Application Priority Data

Jan. 30, 1988 [JP] Japan .................. 63-20338

[51] Int. Cl.$^5$ .................. G01C 3/00; G01C 5/00
[52] U.S. Cl. .................. 356/1; 354/403
[58] Field of Search .................. 356/1; 354/403

[56] References Cited

U.S. PATENT DOCUMENTS

| | | | |
|---|---|---|---|
| 4,582,424 | 4/1986 | Kawabata | 356/1 |
| 4,688,919 | 8/1987 | Ogawa et al. | 354/403 |
| 4,748,469 | 5/1988 | Tamura | 354/403 |

FOREIGN PATENT DOCUMENTS 61-246725 7/1986 Japan .

Primary Examiner—Stephen C. Buczinski
Attorney, Agent, or Firm—Willian Brinks Olds Hofer Gilson & Lione

[57] ABSTRACT

A distance measuring system of the active type for measuring a distance ranging from a short distance to a long distance with a high degree of accuracy. The system comprises light emitting means, three or more light receiving elements, and a selecting means for selecting output signals of different selected pairs of light receiving elements when the light emitting means emits light for first and second times for measuring distances within short and long distance ranges, respectively. The output signals in each selected pair are compared with one another to obtain ratios between them, and distances are calculated based on the ratios thus obtained. A distance to the object is then determined based on the calculated distances. Where the distance measuring system is incorporated in a camera, the lens of the camera is actuated in accordance with the distance value measured by the system.

23 Claims, 15 Drawing Sheets

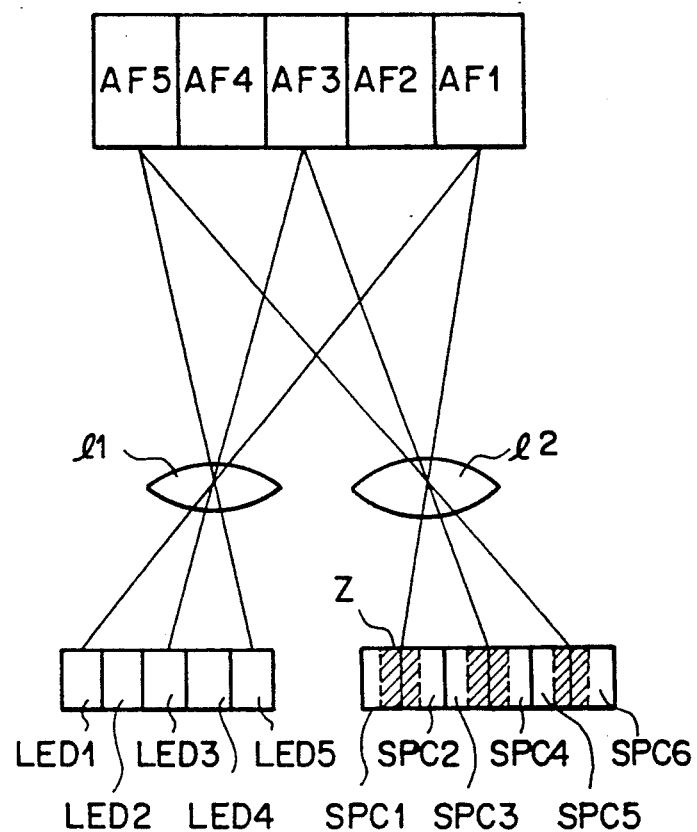
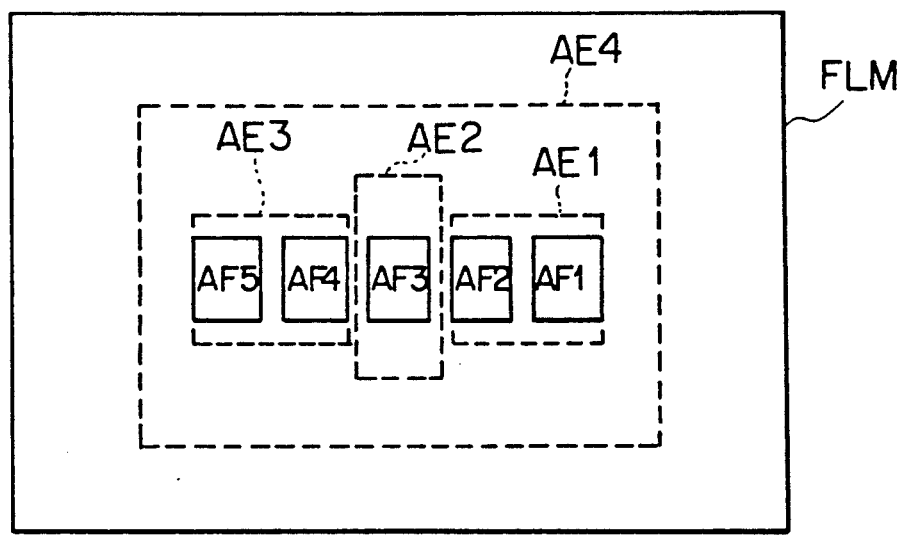

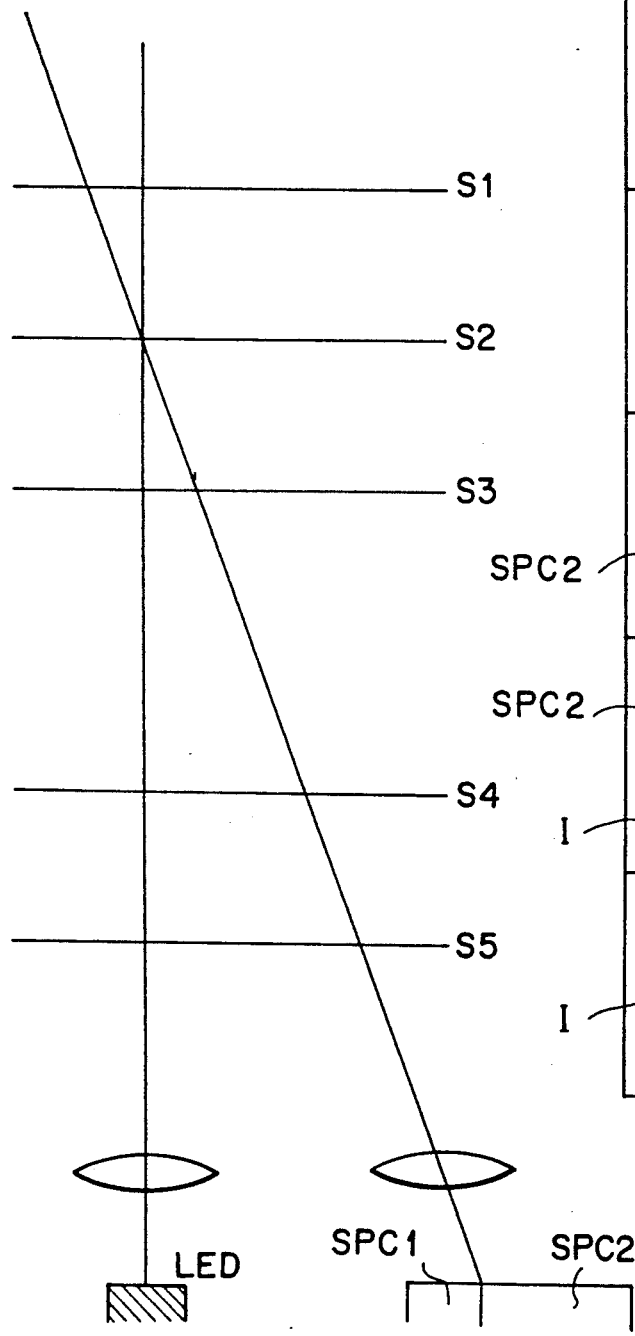
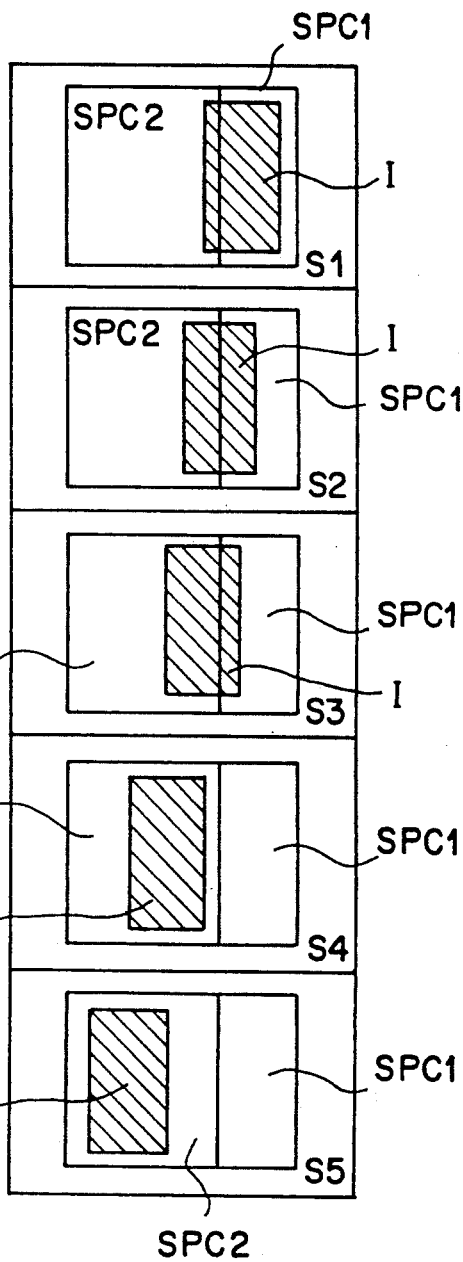
FIG. 21a
FIG. 21b

DISTANCE MEASURING SYSTEM

This application is a continuation, of application Ser. No. 07/302,838, filed Jan. 27, 1989, now abandoned.

BACKGROUND OF THE INVENTION

1. Field of the Invention

The invention relates to a system for measuring a distance to an object to be photographed by a camera.

2. Description of the Prior Art

A distance measuring system of the active type is conventionally employed for a distance measuring system for a camera. The distance measuring system of the active type is constructed such that a parallel beam of light is emitted in parallel to an optical axis of the camera from a light source provided in the camera and an image of a spot on an object for photographing upon which the light beam is irradiated is formed such that it may extend over two light receiving elements disposed sidewardly of the light source in order to detect a distance to the object in accordance with a ratio between outputs of the two light receiving elements. In measuring a distance with the distance measuring system of the active type, since the position of an image formed on a light receiving plane by light which is emitted from a light emitting element and reflected from an object varies in accordance with a distance to the object, the distance to the object is measured in accordance with a ratio between outputs of light receiving elements with respect to the image. However, since the range of distances to the object to be photographed varies widely, the position range in which the image is formed varies as much. Accordingly, if it is attempted to measure a distance to an object which varies from 0 to ∞ while the light emitting element and the light receiving elements are kept fixed, then an image may not be formed on the light receiving elements where the distance is relatively short.

An exemplary one of conventional light measuring system is illustrated in FIGS. 21a and 21b. Referring to FIGS. 21a and 21b, a beam of light projected from a light emitting element LED is reflected from an object for photographing and forms an image I on a pair of light receiving elements SPC1 and SPC2. Since the position of the image I on the light receiving elements SPC1 and SPC2 is differentiated in accordance with a distance to the object which may vary within ranges from S1 to S5, a ratio between outputs of the light receiving elements SPC1 and SPC2 varies in accordance with the position of the image I. The relationship between the distance to the object and the ratio of the output of the light receiving element SPC2 to the output of the light receiving element SPC1 which varies in accordance with the distance is represented by such a relational curve as shown in FIG. 22. Since the ratio increases substantially constantly independently of a reflection factor of the object, the distance to the object can be measured by measuring the ratio. However, where the distance to the object is relatively short as in the distance range S4 or S5 shown in FIG. 21a, the image I formed by reflected light from the object is displaced rightwardly in FIG. 21a so that it may be formed little on the plane of the light receiving element SPC1 but may be formed almost entirely on the other light receiving element SPC2. Consequently, the ratio between outputs of the light receiving elements SPC2 and SPC1 is no more changed in accordance with the distance to the object and thus approaches a saturated condition as seen in FIG. 22. Accordingly, it is a problem that the resolution in distance measurement of the distance measuring system is so deteriorated in a relatively short distance range that measurement of a distance may be disabled.

SUMMARY OF THE INVENTION

It is an object of the present invention to provide a distance measuring system of the active type wherein a distance ranging from a short distance to a great distance can be measured with a high degree of accuracy in accordance with a ratio between outputs of two light receiving elements.

In order to attain the object, according to the present invention, there is provided a distance measuring system for a camera which comprises light emitting means for emitting light twice to an object to be photographed by the camera, light receiving means including three receiving elements arranged in a line along a base length for receiving reflected light from the object to individually output received light signals, ratio calculating means including selecting means for selecting received light signals outputted from a first pair of adjacent ones of the three receiving elements when the light emitting means emits light for the first time and for selecting received light signals outputted from a second pair of adjacent ones of the three receiving elements when the light emitting means emits light for the second time, and means responsive to selection of received light signals for taking a ratio between the thus selected received light signals, distance calculating means for calculating distances based on the ratios obtained by the ratio calculating means, distance determining means for determining a distance based on the two distances calculated by the distance calculating means, and lens driving means for driving a taking lens of the camera based on the distance determined by the distance determining means.

With the distance measuring system according to the present invention, a distance is measured by changing a combination of the light receiving elements to be used depending upon a range of the distance to be measured. Accordingly, a distance can be measured stably with a high degree of accuracy without the necessity of scanning by the light emitting means or the light receiving means. Further, since different combinations of the light receiving elements are used when the light emitting means emits light for the first time and for the second time, a relatively short distance can be measured by the distance measuring system without provision of an additional special distance measuring system which is used for measurement of a short distance. Accordingly, the distance measuring system can be produced at a reduced cost and with a reduced size.

The above and other objects, features and advantages of the present invention will become apparent from the following description and the appended claims, taken in conjunction with the accompanying drawings.

BRIEF DESCRIPTION OF THE DRAWINGS

FIG. 1 is a diagrammatic illustration of an arrangement of light emitting elements and light receiving elements of a distance measuring system showing a preferred embodiment of the present invention;

FIG. 3 is a diagrammatic view illustrating range finding areas and light measuring ranges;

FIG. 21a is a diagrammatic view illustrating a conventional measurement of a distance, and FIG. 21b is a front view of light receiving elements adopted in the distance measurement illustrated in FIG. 21a;

DETAILED DESCRIPTION OF THE PREFERRED EMBODIMENT

Figures 6A, 6B:
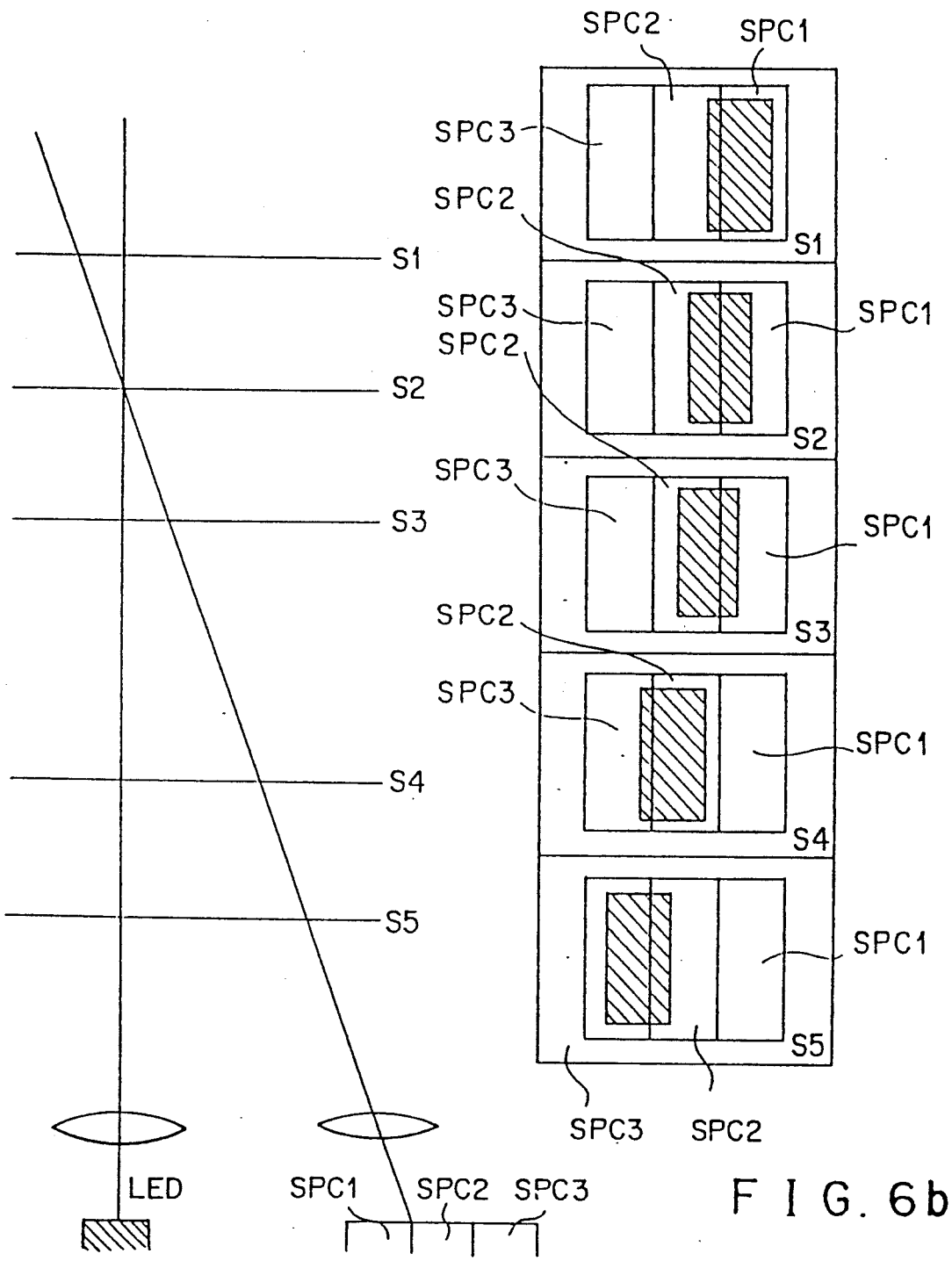
FIGS. 6a and 6b are diagrammatic views illustrating a principle of measurement of a distance with the distance measuring system according to the present invention.
Figure 7A:
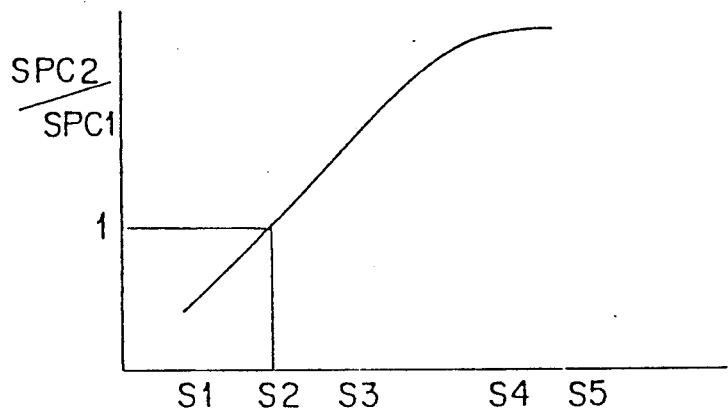
FIGS. 7a and 7b are graphs illustrating a relationship between a distance and a ratio between received light signals in measurement of a distance with the distance measuring system according to the present invention.
Figure 7B:
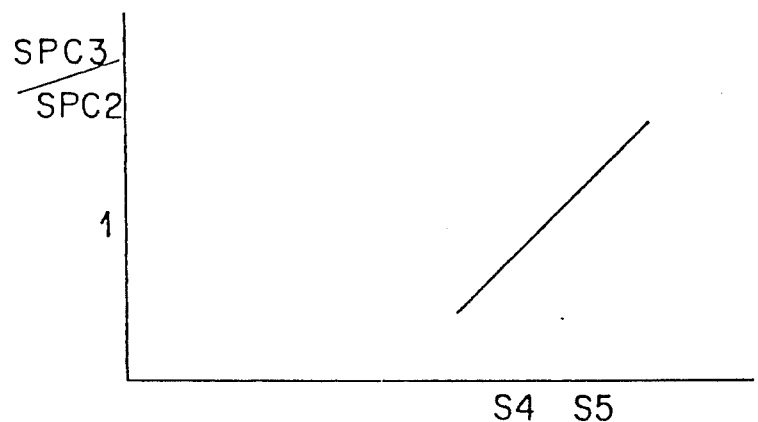
Figure 22:
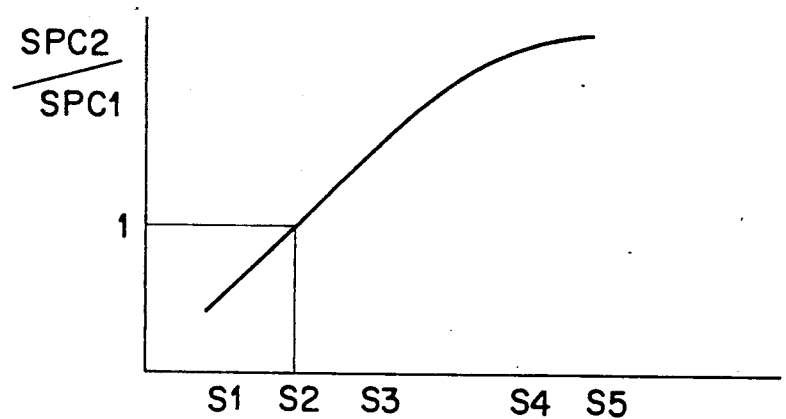
FIG. 22 is a graph illustrating a relationship between a measured distance and a ratio between received light signals in the conventional measurement illustrated in FIG. 22.

Referring at first to FIG. 6, there is illustrated a principle of measurement of a distance with a distance measuring system according to the present invention. The distance measuring system shown includes a light emitting element LED and three light receiving elements SPC1, SPC2 and SPC3 which are arranged such that light emitted from the light emitting element LED is projected to an object to be photographed by a camera in which the distance measuring system is incorporated, and reflected light from the object is received by the three light receiving elements SPC1, SPC2 and SPC3. The light receiving elements SPC1, SPC2 and SPC3 thus produce detection outputs SPC1, SPC2 and SPC3, respectively, in response to the light thus received. A ratio between the outputs SPC2/SPC1 in pair and another ratio between the outputs SPC3/SPC2 in pair are calculated from the detection outputs SPC1, SPC2 and SPC3. Here, an image of the object always extends across a pair of adjacent ones of the light receiving elements SPC1, SPC2 and SPC3 irrespective of a distance range in which the object is located. Accordingly, depending upon the distance to the object, either one of the two ratios remains within the proportional region of the curve shown in FIG. 22 while the other ratio is displaced out of the proportional region. Therefore, selection of a suitable one of the two ratios which remains within the proportional region of the curve depending upon the distance to the object will enable measurement of any distance ranging from a long distance in the range S1 or S2 to a small distance in the range S4 or S5.

Referring now to FIG. 1, there is shown general construction of a distance measuring system according to a preferred embodiment of the present invention. The distance measuring system is generally designed such that it may make distance measurements of an object with respect to five distance measuring or range finding areas AF1 to AF5 on a picture plane shown in FIG. 1 using such a distance measuring method as described above wherein a distance to one area is measured with three light receiving elements.

The distance measuring system includes five light emitting elements LED1 to LED5 arranged in a line perpendicular to an optical axis of a camera in which the distance measuring system is incorporated. A lens 11 is disposed such that a focal plane thereof may be positioned on the line of the light emitting elements LED1 to LED5 and it may project images of the light emitting elements LED1 to LED5 to an object to be photographed by the camera. The images of the light emitting elements LED1 to LED5 on the object are denoted at AF1 to AF5, respectively, and ranges of the images thus make distance measuring ranges in a field of photographing. The images of the light emitting elements LED1 to LED5 on the object are formed on an arrangement of light receiving elements SPC1 to SPC6 by a lens 12. In particular, a shadowed area z, for example, in FIG. 1 represents an image formed by the lens 12 from the image of the light emitting element LED1 on the object and extends, in FIG. 1, over the first and second light receiving elements SPC1 and SPC2. A distance to the object is thus measured by each pair of adjacent ones of the light receiving elements SPC1 to SPC6 in the same manner as in the distance measuring system of the active type described hereinabove. Accordingly, a distance measurement is made with respect to five portions on a photographing image plane. In the distance measuring system described in detail below, a nearest one of results of distance measurements with respect to five portions is selected and the camera is focused upon the shortest distance thus selected. However, a plurality of resulted distance data of measurements may be utilized in any arbitrary manner.

In order to measure a distance, the light emitting elements LED1 to LED5 are lit successively, and each time a light emitting element LED1 to LED5 is lit, a pair of corresponding ones of the light receiving elements SPC1 to SPC5 operate to make a distance measurement. In particular, when the first light emitting element LED1 is lit, the light receiving elements SPC1 and SPC2 operate to make a distance measurement, and then when the second light emitting element LED2 is lit, the light receiving elements SPC2 and SPC3 operate to make a distance measurement. Similarly, when the light emitting elements LED3, LED4 and LED5 are subsequently lit one after another, the corresponding pairs of the light receiving elements SPC3 and SPC4, SPC4 and SPC5, and SPC5 and SPC6 operate to make distance measurements, respectively. While the selections of the receiving element pairs described above are made for measurement of a long distance to an object for photographing, the pair of light receiving elements SPC4 and SPC5 for a small distance are selected again for the light emitting element LED3 so that they may operate to make a measurement in order that, even where the distance to an object is relatively small, a ratio between outputs of selected light receiving elements may remain within the proportional region of the curve shown in FIG. 22.

One of the characteristics of a distance measuring system of the present invention resides in that three or more light receiving elements are disposed for a light emitting element, and in the present embodiment, a distance is measured with respect to the central range finding area AF3 among the plurality of range finding areas AF1 to AF5 in accordance with the present invention. In particular, reflected light from an image of the light emitting element LED3 on an object for photographing is measured by the three light receiving elements SPC3, SPC4 and SPC5 to make a distance measurement. Where the object for photographing is spaced from the camera by a distance greater than a predetermined distance, light emitted from the light emitting element LED3 and reflected from the object is received by the pair of light receiving elements SPC3 and SPC4, and the distance to the object is thus obtained from a ratio between outputs of the light receiving elements SPC3 and SPC4. To the contrary, where an object is spaced by a distance smaller than the predetermined distance, reflected light from the object is displaced rightwardly in FIG. 1 toward the light receiving element SPC5, and accordingly, the distance is determined from a ratio between outputs of the light receiving elements SPC4 and SPC5. Since it is considered that, where an object is at a relatively near location, the object covers an almost entire image plane, it can be considered that a distance measurement only with respect to the central range finding area AF3 will be sufficient for a focusing operation of the camera upon the object at a relatively short distance.

Figure 2:
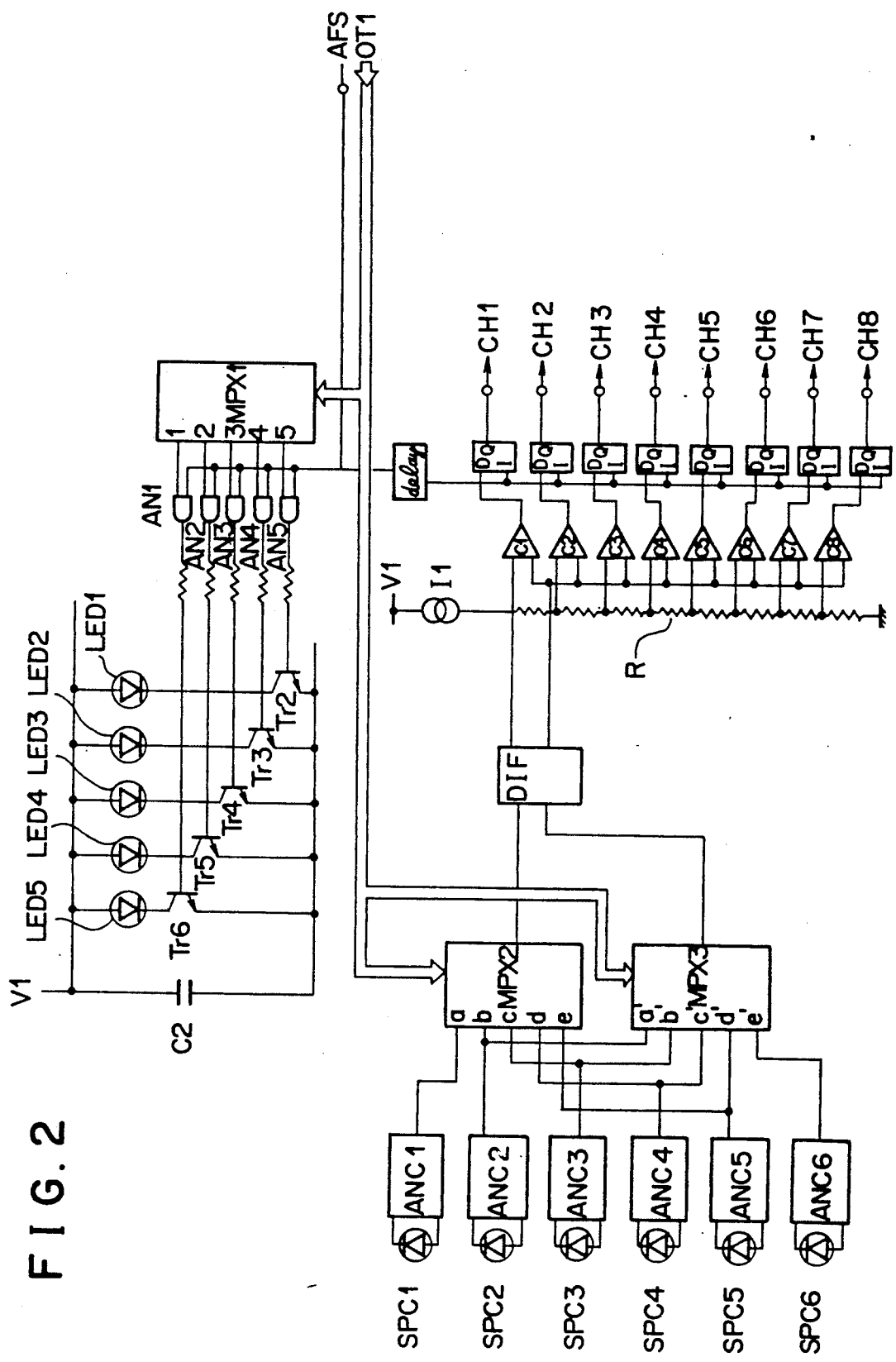
FIG. 2 is a circuit diagram showing a distance measuring circuit of the distance measuring system.

Referring now to FIG. 2, there is shown general construction of an electric circuit of the distance measuring system of the embodiment of the present invention. The circuit includes five light emitting elements LED1 to LED5 in the form of light emitting diodes serving as light sources and six light receiving elements SPC1 to SPC6. The circuit further includes driving transistors Tr2 to Tr6 for driving the light emitting elements LED1 to LED5 to be lit, respectively, and a multiplexer MPX1 for successively selecting the driving transistors Tr2 to Tr6 to drive the light emitting elements LED1 to LED5, respectively. Another multiplexer MPX2 is connected to receive, at input terminals a, b, c, d and e thereof, output signals of the light receiving elements SPC1 to SPC5, respectively, which are converted into logarithmic values by the first five of six logarithmic converting amplifiers ANC1 to ANC6. A further multiplexer MPX3 is connected to receive, at input terminals a', b', c', d' and e' thereof, output signals of the light receiving elements SPC2 to SPC6 which are converted into logarithmic values by the logarithmic converting amplifiers ANC2 to ANC6, respectively. In response to clock pulses from a controlling circuit not shown, the input terminals of the multiplexers MPX1 to MPX3 are selectively enabled successively in a synchronized relationship. Thus, at a timing when the light emitting element LED5 is lit, the output terminals a and a' of the multiplexers MPX2 and MPX3 are enabled so that output signals of the light receiving elements SPC1 and SPC2 converted into logarithmic values by the logarithmic converting amplifiers ANC1 and ANC2 are received by a differential amplifier DIF, which thus produces a difference between the received signals. Since the difference is a logarithmic value, it represents a ratio between the outputs of the light receiving elements SPC1 and SPC2. The difference signal is delivered to comparators c1 to c8. The other input terminals of the comparators c1 to c8 are connected to different points of a voltage divider resistor R in which fixed electric current normally flows so that different reference voltages may be applied to the comparators c1 to c8. The output of the differential amplifier DIF is thus ranked into eight different ranks. Then, when the light emitting elements LED4, LED3, LED2 and LED1 are successively lit, such a sequence of operations as described above successively takes place. Thus, distances to the object for photographing with respect to the portions AF5 to AF1 shown in FIG. 1 are detected successively. After completion of the sequences of operations, the controlling circuit now controls the multiplexer MPX1 to cause the light emitting element LED3 to be selectively lit and controls the multiplexers MPX2 and MPX3 to select the input terminals d and d' thereof, respectively, so as to take out a ranked value of a ratio between outputs of the light receiving elements SPC4 and SPC5 in a similar manner as described hereinabove. The controlling circuit determines, when outputs of the comparators c1 to c8 all present a high voltage level, that the distance to the object is too small to measure it, but detects, in any other case, a distance to the object from a number of those comparators which present outputs of a high ("H") voltage level. One of characteristics of the distance measuring system of the present embodiment resides in that a distance measuring or range finding operation is repeated twice wherein, in the first operation, distances to the object for photographing with respect to the portions AF1 to AF5 shown in FIG. 1 are measured successively, and then in the second operation, the distance with respect to the central portion AF3 is measured again using the next light receiving elements. While the second operation is unnecessary in case a distance with respect to the central portion is found out in the first operation, such repetition of a distance measuring operation as described above will simplify a computer program for operation of the distance measuring system comparing with a modified program wherein the second operation is alternatively executed depending upon whether the distance with respect to the central portion is found out in the first operation. Meanwhile, the reason why a measurement where the object is at a relatively short distance is made only with respect to the central portion of the image plane is that the object always exists at the central portion because the object at such a short distance normally covers the almost entire image plane.

In the following, the distance measuring system of the present invention having such a general construction as described above will be described in detail. Referring first to FIG. 3, there are shown range finding areas and light measuring ranges in a photographing image plane. In particular, five range finding areas AF1 to AF5 are shown in solid lines while four light measuring ranges AE1 to AE4 are shown by broken lines. While multi-point distance measurement and multi-point light measurement are carried out in this manner with the distance measuring system of the present embodiment, one of several objects for photographing which is nearest to the camera is selected as a main object for photographing, and a measured brightness value with respect to one of the light measuring ranges AE1 to AE3 in which the range finding area of the main object is included is determined as a measured brightness value for the main object, and then the measured brightness value from the main object is compared with a measured brightness value from the remaining light measuring range AE4 in order to detect whether or not the object is in rear light.

The light measuring ranges AE1 and AE3 among the light measuring ranges AE1 to AE3 include the range finding areas AF1 and AF2, and AF4 and AF5, respectively, while the remaining light measuring range AE2 includes only the range finding area AF3. The light measuring range AE2 is elongated in a vertical direction compared with the light measuring ranges AE1 and AE2 for the following reasons. I) The light measuring range AE2 thus has a same area with the other light measuring ranges, which eliminates the necessity of adjustment of outputs of measured light which otherwise arises from a difference in area. II) In most cases, a main object for photographing is positioned at the center, and the main object then has a vertically elongated configuration (particularly of a human being).

The range finding areas AF1 to AF5 are provided for measurement of a distance ranging from 1 m to ∞ while the range finding area AF3 is used also for measurement of a distance ranging from 0.5 m to 1 m. The reason why the range of distance to be measured is widened only at the central portion is that, because a main object for photographing is large in size and extends over a wide area of an image plane where the distance is relatively short (0.5 m to 1 m), distance measurement with respect to the central portion will little miss photographing of the main object.

Referring back to FIG. 2, the multiplexer MPX1 delivers, in response to a signal OT1 (signal representing one of the range finding areas AF1 to AF5 from a microcomputer μc (refer to FIG. 4) which serves as the controlling circuit mentioned hereinabove), a high ("H") level voltage from one of output terminals 1 to 5 thereof specified by the signal OT1 so that a range finding area AF1 to AF5 and a light emitting element LED1 to LED5 to be lit may be selected in accordance with Table 1 below. On the other hand, each of the multiplexers MPX2 and MPX3 selects, in response to such a signal OT1 from the microcomputer μc as described above, one of the signals supplied thereto from the associated light receiving elements SPC1 to SPC6 in accordance with the relationship between the range finding areas AF1 to AF5 and the light receiving elements SPC1 to SPC6 specified in Table 1 below, and the thus selected signals are delivered to the differential amplifier DIF. AND circuits AN1 to AN5 are interposed between the outputs 1 to 5 of the multiplexer MPX1 and the transistors Tr6 to Tr2, respectively, such that when a signal "H" is delivered from one of the outputs 1 to 5 of the multiplexer MPX1, a corresponding one of the AND circuits AN1 to AN5 is opened. Thus, when a distance measurement starting signal AFS is applied to the other inputs of the AND circuits AN1 to AN5, it passes the thus opened AND circuit AN1 to AN5 and causes a corresponding one of the transistors Tr2 to TR6 to drive a corresponding one of the light emitting elements LED1 to LED5 to be lit. The light emitting elements LED1 to LED5 are provided for the range finding areas AF1 to AF5, respectively, and a capacitor C2 selectively supplies energy to the light emitting elements LED1 to LED5. Light emitted from one of the light emitting elements LED1 to LED5 and reflected from an object for photographing is received by a corresponding pair of ones of the light receiving elements SPC1 to SPC6 and extracted as logarithmically compressed signals from a corresponding pair of ones of the logarithmic converting or analog circuits ANC1 to ANC6. The logarithmically compressed signals are delivered to and selected by the multiplexers MPX2 and MPX3 and thus transmitted to the differential amplifier DIF at which a difference between them is taken. Again, since a difference between logarithmically compressed signals is taken, actually a ratio between input signals to light receiving elements is taken. Output of the differential amplifier DIF is connected to the comparators c1 to c8 for detecting a voltage level of the output of the differential amplifier DIF, and outputs of the comparators c1 to c8 are individually coupled to latches. The latches are connected to latch outputs of the comparators c1 to c8 in response to a signal received at other input terminals thereof from a delay circuit which is provided to produce an automatic focusing starting signal. The latches deliver the thus latched signals individually to selection channels CH1 to CH8. Again, reference voltages to the comparators c1 to c8 are produced by means of the voltage dividing resistor R and a constant-current element I1 well known in the art.

As shown in FIG. 1, the distance measuring system of the embodiment described above includes the five light emitting elements LED1 to LED5 and the six light receiving elements SPC1 to SPC6. A relationship between the range finding areas and combinations of the light emitting elements and light receiving elements is illustrated in Table 1 below.

TABLE 1

(AT1 Signal Correspondence Table)

| Range Finding Area | Light Emitting Element | Light Receiving Element | OT1 Signal |
| --- | --- | --- | --- |
| AF1 | LED1 | SPC1(a) SPC2(a') | 0H |
| AF2 | LED2 | SPC2(b) SPC3(b') | 1H |
| AF3 | LED3 | SPC3(c) SPC4(c') | 2H |
| AF4 | LED4 | SPC4(d) SPC5(d') | 3H |
| AF5 | LED5 | SPC5(e) SPC6(e') | 4H |
| AF6 | LED3 | SPC4(d) SPC5(e') | 5H |

It is to be noted that AF6 in Table 1 above represents AF3 as switched to the near side measurement.

While the light emitting element LED3 is used for the range finding area AF6 where the OT1 signal is "5H", the light receiving elements SPC4 and SPC5 which are spaced by greater base lengths from the light emitting element LED3 than the light receiving elements SPC3 and SPC4 are used in order to measure a relatively short distance, as different from distance measurement with respect to the range finding area AF3 when the OT1 signal is "3H".

When a distance from the camera to an object for photographing is to be measured with the distance measuring system described above, control signals are delivered from a terminal OT1 of the microcomputer μc to successively make distance measurements with respect to the range finding areas AF1 to AF5 of the object in accordance with the combinations specified in Table 1 above. Detection signals of the light receiving elements SPC1 to SPC6 obtained with respect to the range finding areas AF1 to AF5 are logarithmically compressed, and a difference between each two detection values (a ratio between each two detection outputs) is calculated at the differential amplifier DIF. Difference values thus calculated are set to and stored into the microcomputer μc. A smallest value is then extracted from among the measured distance values thus stored in the microcomputer μc, and the camera thus operates to perform a focusing operation in accordance with the value. Where it is intended to measure a still shorter distance but the light receiving elements SPC4 and SPC5 do not assure satisfactory measurement with respect to the range finding area AF3 for such a short distance, the light receiving elements SPC5 and SPC6 in pair should be used. Such a distance measuring operation as briefly described just above will be described in detail in the following.

Figure 4:
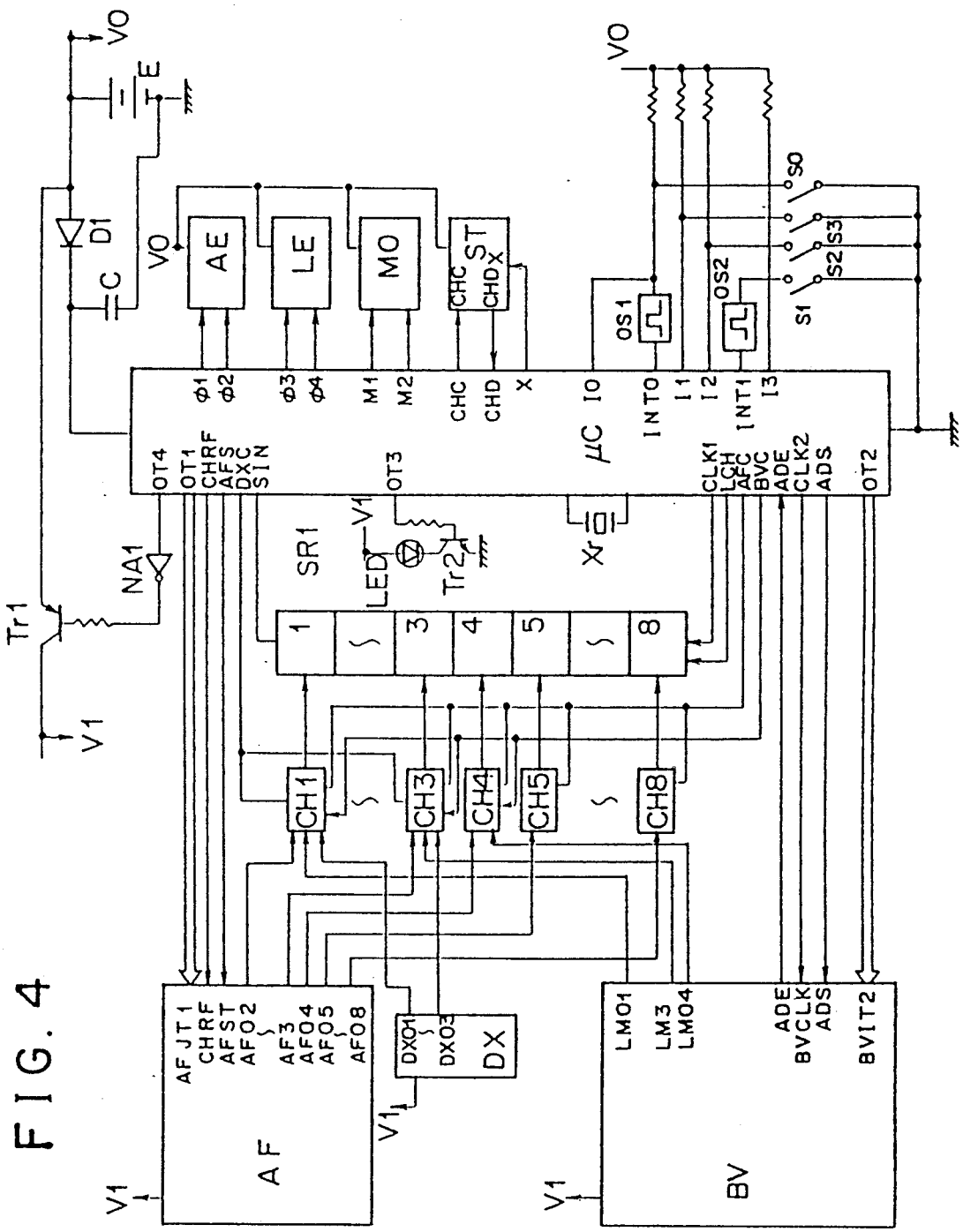
FIG. 4 is a circuit diagram of an entire electric circuit of a camera in which the distance measuring system is incorporated.

Referring to FIG. 4, there is shown in detail an entire electric circuit of the camera in which the distance measuring system described above is incorporated. It is to be noted that the shutter of the camera serves also as a diaphragm. The microcomputer μc of the electric circuit controls a sequencing operation of the entire camera and executes various calculations. Power is supplied from a power source E to the microcomputer μc via a reverse charge preventing diode D1. A backgrounding capacitor C is interposed between the ground and the diode D1. A distance measuring or range finding circuit AF of the active type is provided for measuring a distance to an object for photographing. Further, a film sensitivity reading circuit DX is provided for reading a sensitivity of a film to which a code indicative of the sensitivity is applied, and a light measuring circuit BV is also provided for measuring a brightness of an object for photographing. A measured distance data from the distance measuring circuit AF, a film sensitivity data from the film sensitivity reading circuit DX and a measured brightness data from the light measuring circuit BV are sent to the microcomputer μc via the selecting circuits CH1 to CH8 and a shift register having stages SR1 to SR8. An exposure controlling circuit AE is provided to control opening and closing of the shutter of the camera in accordance with phases and numbers of pulses φ1 and φ2 received from the microcomputer μc. Meanwhile, a lens driving circuit LE is provided to control forward and backward movement of a lens of the camera in accordance with phases and numbers of pulses φ3 and φ4 received from the microcomputer μc. A one frame winding circuit MO is provided to control winding of a film by one frame distance in response to signals M1 and M2 from the microcomputer μc. An electronic flash device ST is provided to start or stop boosting in response to a charge controlling signal CHC from the microcomputer μc and emit flash light in response to a light emission starting signal X from the microcomputer μc. The electronic flash device ST delivers to the microcomputer μc a signal CHD indicative of a charged condition of a capacitor therein not shown. A power supply transistor Tr1 supplies power to the distance measuring circuit AF, film sensitivity reading circuit DX and light measuring circuit BV. The other circuit components including the microcomputer μc are supplied with power directly from the power source E. A crystal oscillator Xr supplies clock pulses to the microcomputer μc, and the microcomputer μc is designed to use two kinds of clock pulses obtained by dividing clock pulses thus delivered from the crystal oscillator Xr. A light emitting diode LED6 is provided to emit light to give a warning when a photographing preparing switch S1 is turned on but the capacitor of the flash device ST is not charged up to a predetermined voltage required for emission of light from the flash device ST.

Figure 12:
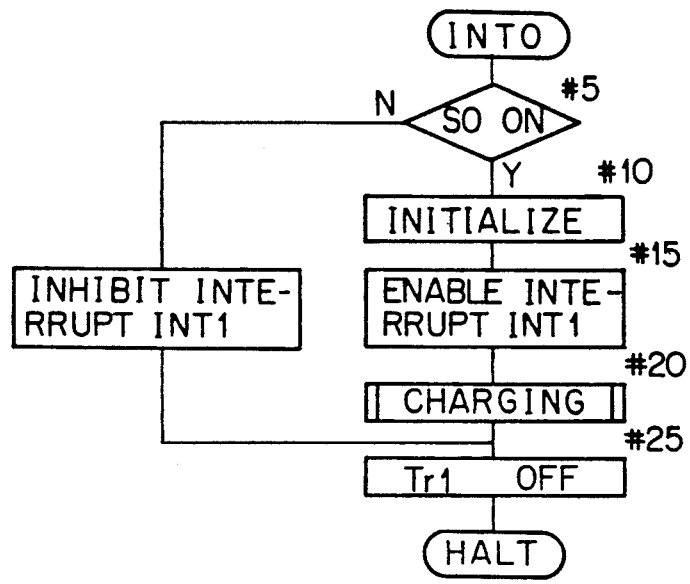
FIG. 12 is a flow chart of an interrupt routine illustrating operation of the circuit shown in FIG. 4.
Figure 13:
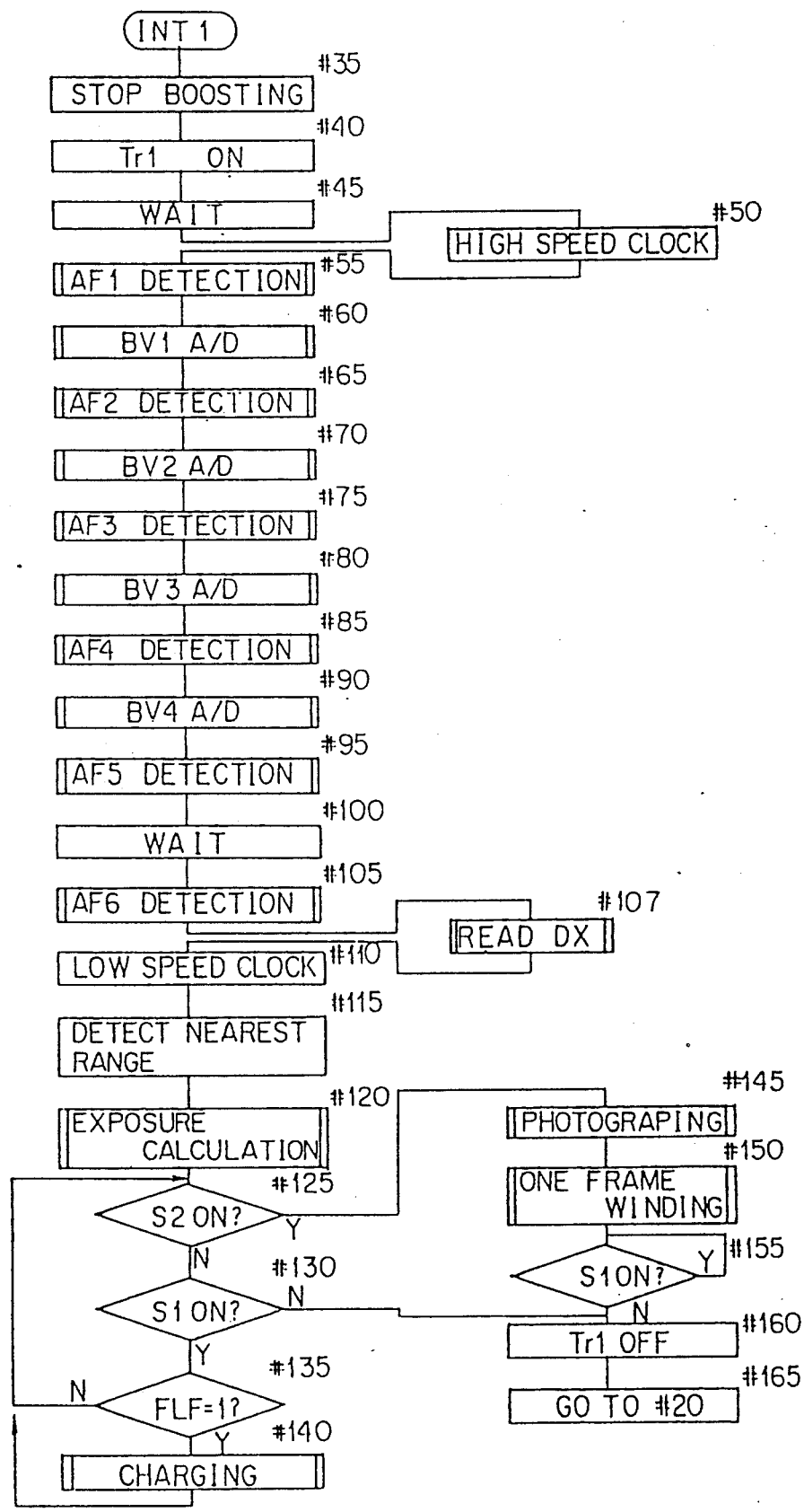
FIG. 13 is a flow chart of another interrupt routine illustrating operation of the circuit shown in FIG. 4.

The circuit further includes several switches. In particular, the circuit includes a main switch S0. A one-shot circuit OS1 produces a pulse in response to a rising or falling edge of a signal produced by turning on or off of the switch S0. The microcomputer μc thus receives the pulse from the one-shot circuit OS1 and executes an interrupt routine INT0 which is illustrated in FIG. 12 and will be hereinafter described. A photographing preparing switch S1 is turned on when a release button not shown of the camera is depressed to a first stroke, and when the switch S1 is turned on, a pulse is produced from another one-shot circuit OS2 and received by the microcomputer μc, which thus executes another interrupt routine INT2 which is illustrated in FIG. 13 and will be hereinafter described. A photographing starting switch S2 is turned on when the release button is depressed to a second stroke deeper than the first stroke, and in response to an on signal of the starting switch S2, the microcomputer μc causes the camera to make a photographing operation. A one frame switch S3 is turned on when a film is wound up by a one frame distance and then turned off when a releasing operation is performed subsequently.

Figure 5:
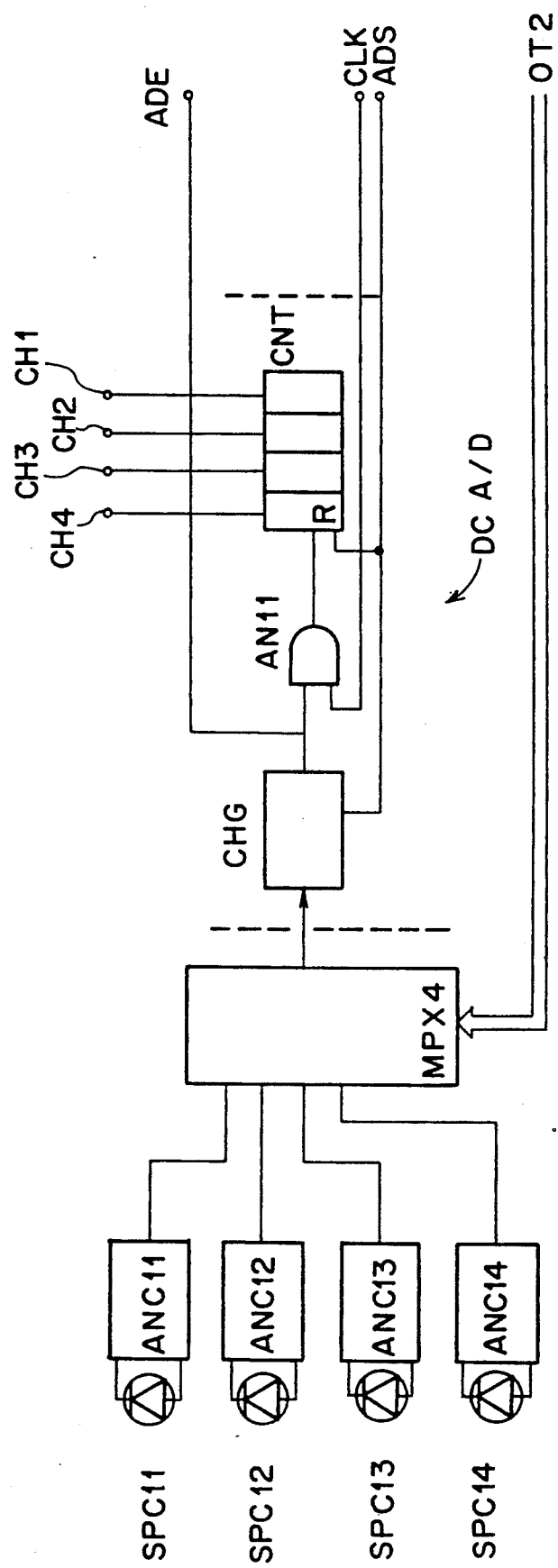
FIG. 5 is a circuit diagram showing a light measuring circuit of the electric circuit of FIG. 4.

Referring now to FIG. 5, detailed construction of the light measuring circuit BV is shown. The measuring circuit BV includes four light receiving elements SPC11 to SPC14 which correspond to the light measuring ranges AE1 to AE4 shown in FIG. 3, and a relationship between them and a relationship of input signals to a multiplexer MPX4 hereinafter described are illustrated in Table 2 just below.

TABLE 2

| Light Measuring Range | Light Receiving Element | Input Signal to Multiplexer MPX4 |
|---|---|---|
| AE1 | SPC11 | 0H |
| AE2 | SPC12 | 1H |
| AE3 | SPC13 | 2H |
| AE4 | SPC14 | 3H |

Light measuring circuits ANC1 to ANC4 receive and process output currents from the light receiving elements SPC11 to SPC14, respectively, and deliver electric currents indicative of brightnesses to the multiplexer MPX4. The light measuring circuit ANC14 corresponds to the light measuring range AE4 and receives an electric current which is different in value from electric currents for the light measuring ranges AE1 to AE3 with respect to a same brightness because the light measuring range AE4 is greater than the other light measuring ranges AE1 to AE3. The light measuring circuit ANC14 thus includes therein means for correcting an output electric current thereof such that it may have an equal value to those of electric currents from the light measuring circuits ANC11 to ANC13 for the light measuring ranges AE1 to AE3 with respect to a same brightness. The multiplexer MPX4 selects one of the outputs of the light measuring circuits ANC11 to ANC14 in response to a signal OT2 from the microcomputer μc and couples the thus selected output to a double integrating analog to digital converter DC.A/D. The double integrating analog to digital converter DC.A/D may be of a well known construction and is shown not in detail but schematically in block diagram in FIG. 5. In particular, the double integrating analog to digital converter DC.A/D includes a charging and discharging circuit CHG which charges a capacitor (not shown) for a period of time while an instruction signal ADS indicative of starting of analog to digital conversion from the microcomputer μc remains in the "H" level until the capacitor presents a predetermined voltage. When the analog to digital conversion starting signal ADS is switched to a low ("L") voltage level, the charging and discharging circuit CHG controls the capacitor to discharge with an electric current corresponding to a brightness value delivered from an effective one of the distance measuring circuits ANC11 to ANC14. Then, when the voltage across the capacitor drops to a predetermined level as a result of such discharge, the charging and discharging circuit CHG delivers an analog to digital conversion completion signal of the "L" level. An AND circuit AN11 and a counter CNT are provided to count a time while such discharge continues. When the analog to digital conversion starting signal ADS is switched to the "L" level, the AND circuit AN11 is opened and the counter CNT starts its counting operation of clock pulses CLK delivered from the microcomputer μc. The counting operation of the counter CNT continues until the charging and discharging circuit CHG delivers an analog to digital conversion completion signal of the "L" level to close the AND circuit AN11. Here, the higher the brightness of an object for photographing, the shorter the time for discharging of the capacitor of the charging and discharging circuit CHG, that is, the smaller the number of clock pulses counted. The counter CNT here is a four-bit counter and delivers four parallel outputs to the selecting circuits CH1 to CH4.

Figure 8:
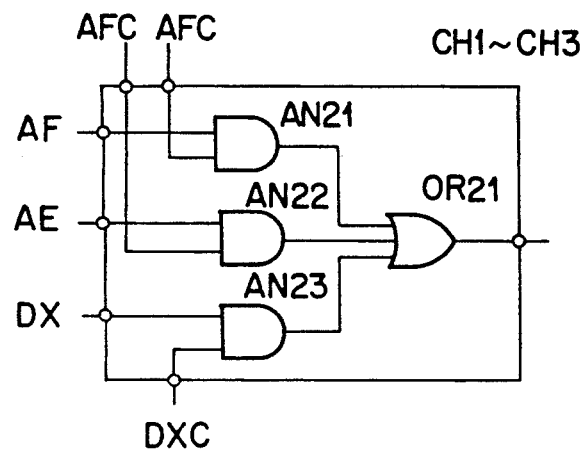
FIG. 8 is a circuit diagram showing detailed construction of first to third selecting circuits of the circuit shown in FIG. 4.
Figure 9:
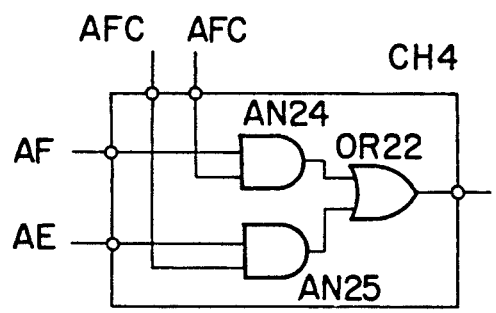
FIG. 9 is a circuit diagram showing detailed construction of a fourth selecting circuit of the circuit shown in FIG. 4.
Figure 10:
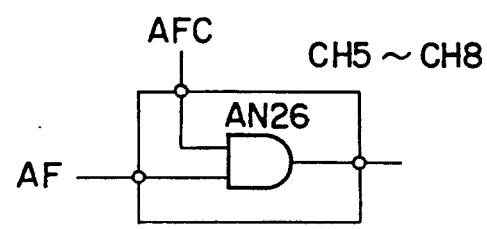
FIG. 10 is a circuit diagram showing detailed construction of fifth to eighth selecting circuits of the circuit shown in FIG. 4.

FIGS. 8 to 10 illustrate detailed construction of the selecting circuits CH1 to CH8 shown in FIG. 4. Referring first to FIG. 8, there is shown detailed construction of each of the selecting circuits CH1 to CH3. The selecting circuit shown includes three AND circuits AN21, AN22 and AN23 and receives, at one input terminal of the AND circuits AN21, AN22 and AN23 thereof, a measured distance signal, a measured brightness signal and a film sensitivity signal as information signals from the distance measuring circuit AF, light measuring circuit AE and film sensitivity reading circuit DX, respectively. A distance measurement controlling signal AFC, a light measurement controlling signal AEC and a film sensitivity reading controlling signal DXC from the microcomputer μc are received at the other input terminals of the AND circuits AN21, AN22 and AN23, respectively, so that the measured distance signal, measured brightness signal or film sensitivity signal may be selectively passed through the AND circuit AN21, AN22 or AN23. The selectively passed signal is delivered as an output of the selecting circuit from an OR circuit OR21. Referring now to FIG. 9, there is shown detailed construction of the selecting circuit CH4. The selecting circuit CH4 includes two AND circuits AN24 and AN25 connected to receive a measured distance signal and a measured brightness signal, respectively, and an OR circuit OR22 connected to the AND circuits AN24 and AN25. FIG. 10 shows detailed construction of each of the selecting circuits CH5 to CH8. The selecting circuit shown in FIG. 10 includes a single AND circuit AN26 connected to receive a measured distance signal.

Figure 11:
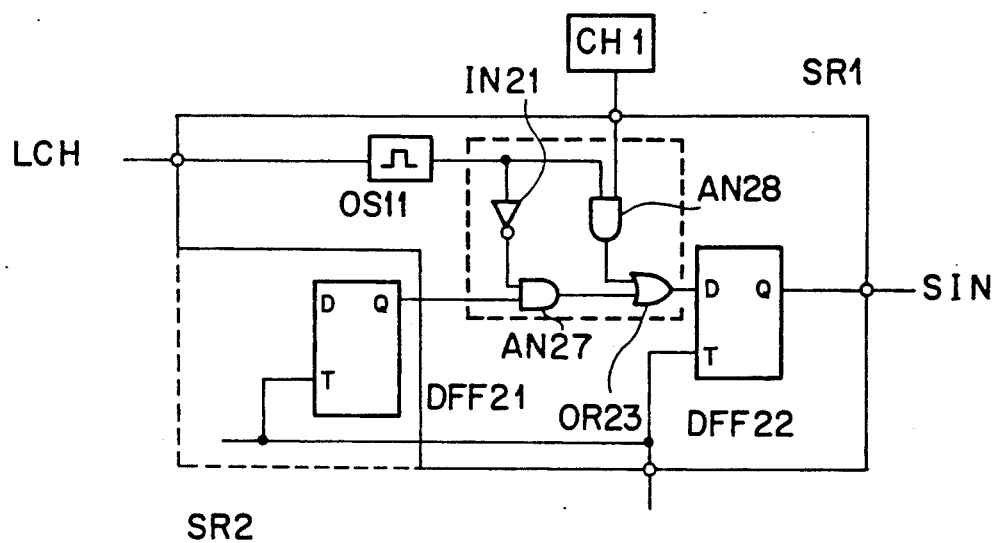
FIG. 11 is a circuit diagram illustrating detailed construction of a shift register of the circuit shown in FIG. 4.

FIG. 11 shows detailed construction of the first stage SR1 of the shift register shown in FIG. 4 as a representative one of the stages SR1 to SR8. When a latching signal is received from an output terminal LCH of the microcomputer μc, a one-shot circuit OS11 operates to produce a single pulse of the "H" level. While the pulse of the "H" level continues, an AND circuit AN28 is opened so that a signal from the selecting circuit CH1 is permitted to be received by an input terminal D of a latch circuit DFF22. While the pulse of the "H" level of the one-shot circuit OS11 continues, clocks from the microcomputer μc are received at another input terminal T of the latch circuit DFF22, and the latch circuit DFF22 latches a signal from the selecting circuit CH1 in response to a rising edge of each of such clock pulses and outputs the thus latched signal from an output terminal Q thereof. The one-shot circuit OS11 is designed such that the pulse thereof may disappear or fall to close the AND circuit AN28 before a first clock pulse from the microcomputer μc falls. The microcomputer μc reads a data delivered from the first stage SR1 of the shift register in response to a falling edge of each of the clock pulses. The latch DFF22 of the first stage SR1 of the shift register latches and outputs an output signal of a latch circuit DFF21 of a preceding stage SR2 of the shift register via an AND circuit AN27 and an OR circuit OR23 in response to a rising edge of a second clock pulse. In this manner, an output of a latch circuit of each stage of the shift register is latched to a latch circuit of the next stage of the shift register in response to a rising edge of each clock pulse from the microcomputer μc. The microcomputer μc delivers up to eight clock pulses to the shift register so that output data of the selecting circuits CH1 to CH8 are transmitted in series to the microcomputer μc by way of the shift register SR1 to SR8. Such transmission of data is hereinafter referred to as serial transmission (SIO). Thus, the shift register SR1 to SR8 is of the parallel-in serial-out type.

In the following, operation of the electric circuit of the camera having such a construction as described above will be described with reference to FIGS. 12 to 20 which show flow charts of operation of the microcomputer μc. When the main switch S0 shown in FIG. 4 is manually operated, a pulse is delivered from the one-shot circuit OS1 to an interrupt terminal INT0 of the microcomputer μc. Upon reception of the pulse, the microcomputer μc executes an interrupt routine INT0 shown in FIG. 12. In the interrupt routine INT0, the microcomputer μc detects, at first at step #5, in accordance with a voltage level at an input terminal I0 thereof whether the switch S0 is turned on or off, and when the switch S0 is turned on and the input terminal I0 is at the "L" level, it is determined that photographing is to be performed, and the microcomputer μc initializes all of the output terminals and flags thereof at step #10 and enables an interruption at another interrupt terminal INT1 by the photographing preparing switch S1 at step #15. Then, the microcomputer μc executes controlling of charging of the electronic flash device ST at step #20. A subroutine for such charging control is illustrated in FIG. 16. Referring to FIG. 16, the microcomputer μc detects, at first at step #205, in accordance with a signal CHD from the electronic flash device ST whether charging of the electronic flash device ST has been completed. In case the signal CHD is at the "L" level and the electronic flash device ST has not yet completed its charging operation, the microcomputer μc changes, at step #210, its boosting controlling signal CHC to the "H" level to cause the electronic flash device ST to start its boosting operation. Then at step #215, the microcomputer μc checks a level at an input terminal I3 thereof to detect whether or not the switch S1 is on, and in case the switch S1 is on and the level at the input terminal I3 is "L", the microcomputer μc changes, at step #220, its output terminal OT3 to the "H" level to cause the light emitting diode LED6 to be lit so as to give an indication that the electronic flash device ST has not yet completed its charging operation. After then, the microcomputer μc returns its sequence to step #205. Such an indication by the light emitting diode LED6 is only permitted when the subroutine shown in FIG. 16 is entered at step #140 which will be hereinafter described and will not take place during execution of the interrupt routine INT0. On the other hand, when the photographing preparing switch S1 is off and the input terminal I3 is at the "H" level at step #215, the output terminal OT3 is changed to the "L" level to cause the light emitting diode LED6 to be extinguished at step #217, and then the sequence returns to step #205. In case charging of the electronic flash device ST is completed and the output signal CHD thereof is at the "H" level at step #205, the boosting controlling signal HC is changed to the "L" level to stop the boosting operation of the electronic flash device ST at step #225. Then at step #230, the microcomputer μc checks an input terminal IT3 thereof to determine whether the photographing preparing switch S1 is on or off, and when the input terminal IT3 is at the "L" level and the switch S1 is on, the microcomputer μc changes, at step #235, the output OT3 thereof to the "L" level to cause the light emitting diode LED6 to be extinguished, whereafter the sequence returns, in this instance, to step #20 of the interrupt routine INT0 shown in FIG. 12. To the contrary, when the photographing preparing switch S1 is off at step #230, the sequence returns directly to step #20. Referring back to FIG. 12, after completion of the charging control at step #20, the microcomputer μc changes, at step #25, its output terminal OT4 to the "L" level to turn the power supply transistor Tr1 off to stop supply of power from the power supply transistor Tr1. In this instance, production of clock pulses by the microcomputer μc is also stopped, but it is resumed when interruption occurs by way of the input terminal INT0 or INT1 of the microcomputer μc. In case it is determined at step #5 that the main switch S0 is turned off, the microcomputer μc inhibits interruption by the photographing preparing switch S1 at step #30, and then advances the sequence to step #25 at which the output terminal OT4 thereof is changed to the "L" level to turn the power supply transistor Tr1 off to stop its supply of power. After then, the microcomputer μc places itself into a halted state.

Subsequently, another interrupt routine INT1 by the photographing preparing switch S1 will be described with reference to FIG. 13. When the photographing preparing switch S1 is turned on, a pulse is produced from the one-shot circuit OS2 in response to the signal of the photographing preparing switch S1. The microcomputer μc receives the pulse and thus executes the interrupt routine INT1.

In the interrupt routine INT1, the microcomputer μc changes, at first at step #35, the output CHC thereof to the "L" to stop boosting of the electronic flash device ST in order to stabilize the power supply voltage, and then at step #40, the output OT4 thereof is changed to the "H" level to turn the power supply transistor Tr1 on to start supply of power to the required circuits. Then at step #45, the microcomputer μc waits for an interval of time until the distance measuring circuit AF and the light measuring circuit Bv are brought into a stabilized condition. At subsequent step #50, the microcomputer μc changes over clocks for execution of processing from clocks for low speed processing to clocks for high speed processing in order to reduce a time required for data processing, particularly for data transmission. Before changing over to high speed clocks, the microcomputer μc operates with low speed clocks. Subsequently, a distance measuring processing and a light measuring processing are repeated at steps #55, #60, #65, #70, #75, #80, #85, #90 and #95 to obtain measured distance data with respect to five range finding areas and measured brightness data with respect to four light measuring regions. Such processings are illustrated in flow charts shown in FIGS. 14 and 15.

Figure 14:
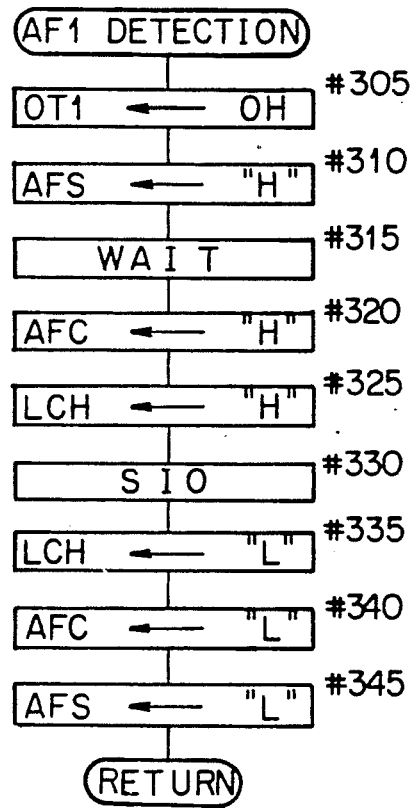
FIG. 14 is a flow chart showing a distance measuring subroutine.

Referring to FIG. 14, there is shown a flow chart of operation of detecting a distance with respect to the range finding area AF1. After the routine illustrated in FIG. 14 is entered, the microcomputer μc delivers, at first at step #305, a signal indicative of 0H (H represents that the number is a hexadecimal number) from the terminal OT1 thereof in order to designate the range finding area AF1 as an object for measurement of a distance. Then at step #310, the distance measurement starting signal AFS is changed to the "H" level. Consequently, the transistor Tr2 is turned on via the AND circuit AN5 shown in FIG. 2 so that the infrared light emitting diode LED1 is energized with energy of the capacitor C2 to emit light therefrom. Infrared light thus emitted is reflected from an object for photographing and then received effectively by the light receiving elements SPC1 and SPC2. The light receiving elements SPC1 and SPC2 produce corresponding signals which are transmitted via the logarithmic converting circuits ANC1 and ANC2 and the multiplexer MPX2 to the differential amplifier DIF at which they are compared with each other. Output of the differential amplifier DIF is compared with the eight reference voltages at the comparators c1 to c8 and selectively passes the comparators c1 to c8 so that a measured distance data is latched to the latch circuits connected to the comparators c1 to c8. The microcomputer μc then waits at step #315 for a sufficient interval of time until such latching of a measured distance data takes place. Then at step #320, the distance measurement controlling signal AFC is changed to the "H" level to instruct the selecting circuits CH1 to CH8 to select measured distance signals, and then at step #325, the latching signal LCH is changed to the "H" level. Then, eight clock pulses are supplied to the shift register SR1 to SR8 to effect serial data transmission SIO in which the microcomputer μc reads the measured distance data and stored therein at step #330. Then at steps #335, #340 and #345, the microcomputer μc changes all of the latching signal LCH, distance measurement controlling signal AFC and distance measurement starting signal AFS from the "H" level to the "L" level, whereafter the sequence returns, in this instance, to step #55 from which the subroutine shown in FIG. 14 has been entered. A distance detecting operation with respect of any other range finding area AF2 to AF5 proceeds in a quite similar manner at each of steps #65, #75, #85 and #95 except that a signal which is delivered from the terminal OT1 of the microcomputer μc at step #305 of the flow chart shown in FIG. 14 is different according to a range finding area with respect to which a distance measurement is to be performed subsequently at steps from #310 to #345.

Figure 15:
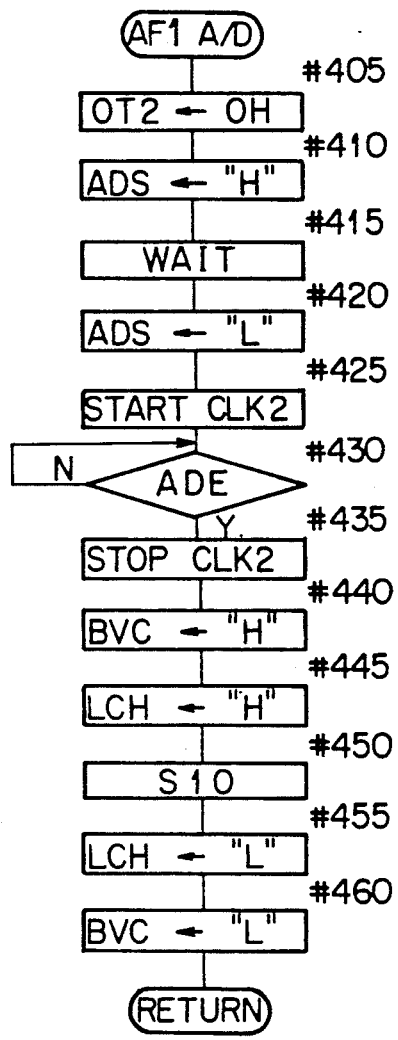
FIG. 15 is a flow chart showing a light measuring subroutine.
Figure 16:
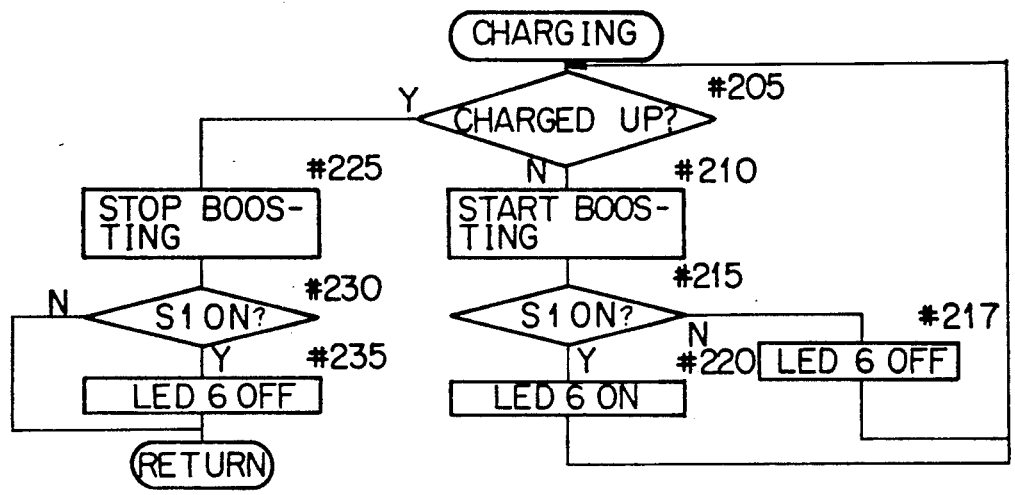
FIG. 16 is a flow chart showing a charging controlling subroutine.

Referring now to FIG. 15, there is shown in flow chart the light processing at step #60 in the flow chart of FIG. 13. After the subroutine shown in FIG. 15 is entered, the microcomputer μc delivers a signal representative of a light measuring range from the output terminal OT2 thereof at first at step #405. In response to the signal, the multiplexer MPX4 of the light measuring circuit BV shown in FIG. 5 connects an output of the light receiving element SPC11 to the double integrating analog to digital converter DC.A/D. Then at step #410, the microcomputer μc delivers an analog to digital conversion starting signal ADS of the "H" level. The charging and discharging circuit CHG starts charging of the capacitor not shown in response to the analog to digital conversion starting signal ADS. The microcomputer μc thus waits, at step #415, for an interval of time sufficient for such charging, and then changes, at step #420, the analog to digital conversion starting signal ADS to the "L" level. Thereupon, the charging and discharging circuit CHG starts discharging of the charged capacitor in accordance with a measured brightness output. Then at step #425, the microcomputer μc starts delivery of clocks CLK2, and then at step #430, the microcomputer μc waits until a signal ADE indicative of completion of the analog to digital conversion is received from the double integrating analog to digital converter DC.A/D. After reception of such signal ADE, the microcomputer μc stops the delivery of clocks CLK2 at step #435. Then, the microcomputer μc changes the light measurement controlling signal BVC and the latching signal LCH to the "H" level at steps #440 and #445, respectively, and then serial transmission SIO is executed to read the measured brightness data at step #450. After then, the signals LCH and BVC are changed from the "H" level to the "L" level at steps #455 and #460, respectively, whereafter the sequence returns, in this instance, to step #60 of the flow chart shown in FIG. 13 from which the subroutine shown in FIG. 15 has been entered. Control of analog to digital conversion with respect to any other light measuring range AE2 to AE4 and reception of such data by the microcomputer μc proceed in a quite similar manner at steps #70, #80, and #90 except that a signal which is delivered from the terminal OT2 of the microcomputer μc at step #405 is different according to a light measuring area with respect to which a brightness measurement is to be performed subsequently at steps from #410 to #460.

Here, the reason why a distance measuring operation and a light measuring operation are executed alternately at steps #55 to #95 is described. As described hereinabove, in the distance measuring or range finding circuit shown in FIG. 2, energy with which the light emitting elements LED1 to LED5 are to be driven to emit light is supplied from the capacitor C2. However, after emission of light from any of the light emitting elements LED1 to LED5, it takes a considerable time to charge the capacitor C2 to a predetermined voltage again. Accordingly, if a distance measuring operation is executed successively before the capacitor C2 is not charged to the predetermined voltage, sufficient light is not emitted from a next one of the light emitting elements LED1 to LED5 and a range in which a distance measurement is possible is limited to the remote side. Thus, in order to assure such a charging time, analog to digital conversion of measured light and reception of such data by the microcomputer μc is executed after a distance measuring operation. A time required for such analog to digital conversion of measured light and reception of data by the microcomputer μc is about 10 msec. which is sufficient to charge the capacitor C2 to the predetermined voltage. While it is otherwise possible to repeat a distance measuring operation successively by five times, such repetition will require a waiting time for charging up of the capacitor C2 (a total of 40 milliseconds here) and require a long release time lag. Accordingly, such successive repetition of a distance measuring operation will lead to drawbacks that an image may blur when a moving object for photographing is photographed and that a number of frames of a film which can be successively photographed per unit time decreases.

Referring back to FIG. 13, after completion of a distance measurement with respect to the range finding area AF5 at step #95, the microcomputer μc waits at step #100 for a sufficient interval of time to charge the capacitor C2 to a predetermined voltage, and then at step #105, the microcomputer μc changes the distance range for the range finding area AF3 to the near side and executes a distance measurement with respect to the range finding area AF3. While a distance measurement here is executed only with respect to the range finding area AF3, it may be executed otherwise with respect to all of the range finding areas AF1 to AF5 again. This, however, requires an unnecessarily long period of time. On the other hand, if it is intended to measure a distance to an object for photographing (a person) at a short distance (0.5 to 1.5 m), the object makes a relatively large image which may include almost of the range finding areas AF1 to AF5 shown in FIG. 3. Accordingly, a distance measurement only with respect to the central measuring area AF3 is sufficient. In the distance measurement with respect to the measuring area AF3, the light emitting element LED3 and the light receiving elements SPC4 and SPC5 are used to assure a long base line length so as to cope with a distance measurement on the near side. In this instance, the microcomputer μc processes input signals from the distance measuring circuit AF to make a determination of a distance with respect to the range finding area AF3 on the near side.

Figure 18:
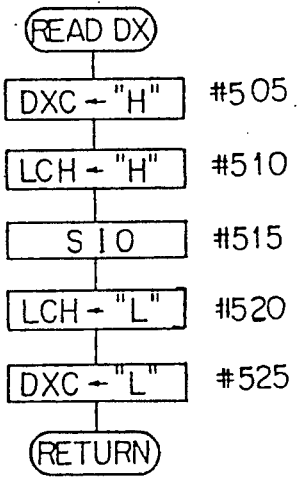
FIG. 18 is a flow chart showing a film sensitivity reading subroutine.

After completion of the distance measurement at step #105, the microcomputer μc advances to step #107 at which it executes a sequence of operations for reading a sensitivity of a film. Details of the sequence are illustrated in a flow chart shown in FIG. 18. Referring to FIG. 18, the microcomputer μc changes, at first at step #505, the film sensitivity reading controlling signal DXC to the "H" level to cause the selecting circuits CH1 to CH8 to output a signal indicative of a sensitivity of the film, and then at step #510, the latching signal LCH is changed to the "H" level, whereafter serial transmission SIO is executed to receive data of the film sensitivity into the microcomputer μc at step #515. Then, the latching signal LCH and the film sensitivity reading controlling signal DXC are changed to the "L" level at steps #520 and #525, respectively, whereafter the sequence returns to step #107 of the flow chart shown in FIG. 13 from which the subroutine shown in FIG. 18 has been entered.

Referring back to FIG. 13, the sequence advances from step #107 to step #110 at which the microcomputer μc changes over the processing clocks back to clocks for low speed processing to reduce power consumption of the circuit. Then at step #115, a range or ranges of distance which are nearest to the camera is detected from among the measured distance data with respect to all of the range finding areas AF1 to AF5.

Figure 19:
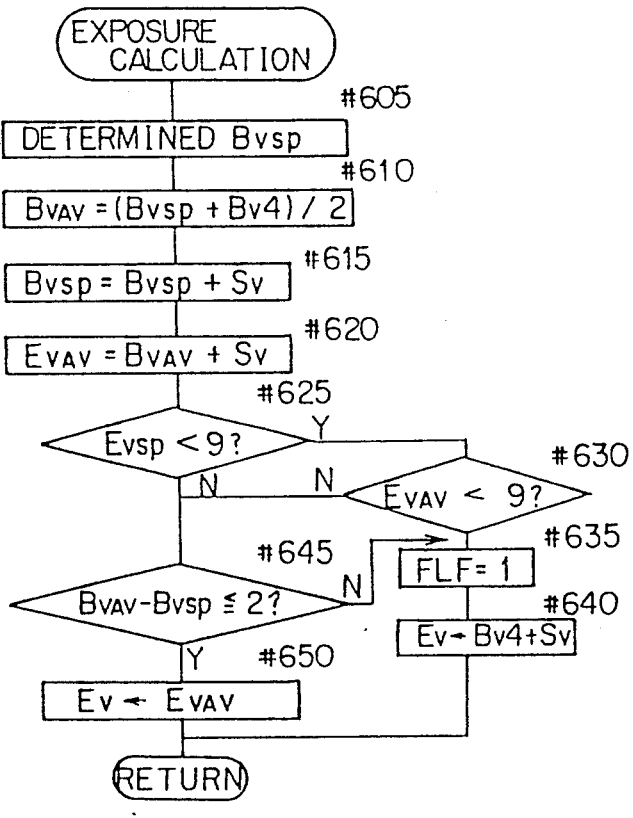
FIG. 19 is a flow chart showing an exposure controlling subroutine.

Subsequently at step #120, the microcomputer μc executes exposure calculation for determining an exposure value. Details of such exposure calculation are illustrated in a flow chart of FIG. 19. Referring to FIG. 19, the microcomputer μc determines, at step #605, a measured brightness value Bvsp of the object for photographing with respect to the nearest distance range or ranges detected at step #115 in accordance with Table 3 below. It is to be noted that, in Table 3 below, AF6 represents AF3 as switched to the near side, and in the left-hand side column, a mark + represents logical AND and a pair of parentheses represent logical OR.

TABLE 3

| Nearest Range(s) | | | Spot Measured Brightness Value |
|---|---|---|---|
| AF1 | | | Bvsp = Bv1 |
| AF2 | | | Bvsp = (2Bv1 + Bv2)/3 |
| AF3 | | | Bvsp = Bv2 |
| AF4 | | | Bvsp = (2Bv3 + Bv2)/3 |
| AF5 | | | Bvsp = Bv3 |
| AF6 | | | Bvsp = (Bv1 + 2Bv2 + Bv3)/4 |
| AF1 | | | |
| AF2 | + AF3 | | Bvsp = (Bv1 + BV2)/2 |
| AF1 + AF2 | | | |
| AF1 | | AF4 | |
| AF2 | + AF3 + | AF5 | Bvsp = (BV1 + Bv2 + Bv3)/3 |
| AF1 + AF2 | | AF4 + AF5 | |
| AF4 | | | |
| AF5 | + AF3 | | Bvsp = (Bv2 + Bv3)/2 |
| AF4 + AF5 | | | |
| AF1 | | AF4 | |
| AF2 | | + AF5 | Bvsp = (Bv1 + Bv3)/2 |
| AF1 + AF2 | | AF4 + AF5 | |

In accordance with Table 3, where the nearest range is one of the areas AF1, AF3 and AF5, only a measured brightness value with respect to a light measuring range which includes the nearest area is used. To the contrary, where the nearest range is the area AF2 or the area AF4, (2Bv1+Bv2)/3 or (2Bv3+Bv2)/3 including the central portion is used as a measured brightness value Bvsp of the object because the nearest range is also included in the light measuring area at the central portion although it depends upon a size of the object. Where the nearest range is the area AF3, it is considered that the object is large in size. Accordingly, all of the light measuring ranges are used and the central light measuring range is weighted more significantly than the other light measuring ranges, and (Bv1+2Bv2+Bv3)/4 is employed as a measured brightness value Bvsp of the object. Where the nearest ranges are the range finding areas AF3 and AF1 or AF2 or AF1 and AF2, or where the nearest ranges are the range finding areas AF3 and AF4 or AF5 or AF4 and AF5, an average between the measured brightness value Bv2 with respect to the central light measuring range AE2 and the measured brightness value Bv1 with respect to the light measuring range AE1 or the measured brightness value Bv3 with respect to the light measuring range AE3, that is, (Bv1+Bv2)/2 or (Bv2+Bv3)/2 is used as a measure brightness value Bvsp of the object. Where the nearest ranges are the range finding areas AF3 and AF1, AF2 or AF1+AF2 or the range finding areas AF3 and AF4, AF5 or AF4+AF5, (Bv1+Bv2+Bv3)/3 is employed as a brightness value of the object. Where the nearest ranges are the range finding areas AF1, AF2 or AF1+AF2 and AF4, AF5 or AF4+AF5, (Bv1+Bv3)/2 is employed as a measure brightness value Bvsp of the object.

Referring back to FIG. 19, the sequence advances, after the determination of a measured brightness value Bvsp at step #605, to step #610 at which the microcomputer μc calculates an average measured brightness value Bvav in accordance with an equation (Bvsp+Bv4)/2. Subsequently at steps #615 and #620, an exposure value Evsp for the object and an average exposure value Evav are calculated in accordance with equations Bvsp+Sv (Sv: film sensitivity) and Bvav+Sv, respectively. Then, in case it is discriminated at steps #625 and #630 that the exposure values Evsp and Evav are both smaller than a predetermined value 9Ev, it is considered that the brightness of the object will cause underexposure and the microcomputer μc thus advances its sequence to step #635 in order to cause the camera to enter flash photographing. At step #635, a flag FLF indicative of flash photographing is set to "1", and then at step #640, a sum of the measured brightness value Bv4 with respect to the light measuring range AE4 and the film sensitivity Sv is determined as an effective exposure value Ev in order to make the background appropriate. After then, the sequence returns to step #120 of the flow chart shown in FIG. 13. To the contrary, in case it discriminated at step #625 or #630 that at least one of the exposure values Evsp and Evav is equal to or greater than the predetermined value, the sequence advances from step #625 or #630 to step #645 at which a difference between the average measured brightness value Bvav and the measured brightness value Bvsp of the object is calculated in order to detect whether or not the object is in a backlighted condition. In case the difference is greater than 2Ev, the microcomputer μc determines that the object is in a backlighted condition and thus advances the sequence to step #635 in order to cause the camera to perform flash photographing. To the contrary, where the difference is equal to or smaller than 2Ev at step #645, the average exposure value Evav is determined as an effective exposure value Ev at step #650, whereafter the sequence returns to step #120 of the flow chart shown in FIG. 13.

Figure 17:
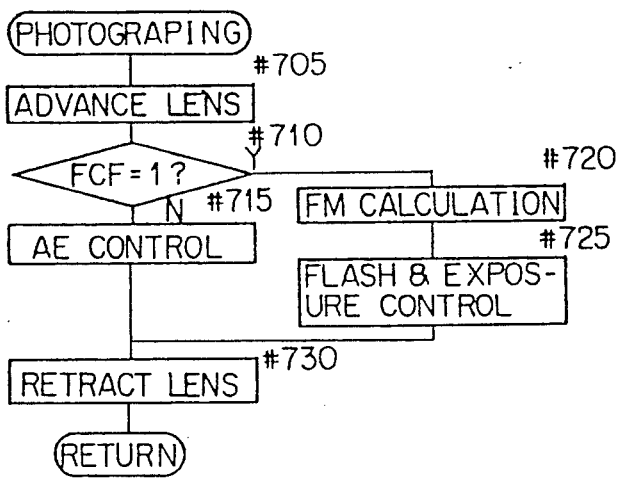
FIG. 17 is a flow chart showing a photographing subroutine.

Referring back to FIG. 13, the microcomputer $\mu$c judges, at step #125 after completion of processing of the exposure calculation at step #120, whether the release button S2 is depressed or not. In case the judgement is negative, the microcomputer $\mu$c subsequently judges, at step #130, whether or not the photographing preparing switch S1 is on. Where the switch S1 is on, the flag FLF is checked at step #135 to judge whether or not flash photographing should be done, and in case the flag FLF is FLF=0 and accordingly flash photographing should be done, charging control illustrated in FIG. 16 is executed at step #140, whereafter the sequence returns to step #140, whereafter the sequence returns to step #125. Meanwhile, in case it is judged at step #135 that the flag FLF is FLF=0 representing that flash photographing should not be done, the sequence returns directly to step #125 without executing such charging control as illustrated in FIG. 16. In case the release button S2 is on at step #125, a photographing operation is executed at step #145. Details of the photographing operation are illustrated in FIG. 17. Referring to FIG. 17, the microcomputer $\mu$c controls, at step #705, to advance the lens of the camera in accordance with information of the distance of the nearest range. At step #710 after completion of such advancement of the lens at step #705, the microcomputer $\mu$c checks the flag FLF to judge whether or not flash photographing should be done. In case the flag FLF is FLF=1 representing that flash photographing should be done, the microcomputer $\mu$c calculates, at step #720, an aperture value for flash photographing in accordance with an equation GN=F×D, where GN is a guide number, F an aperture value and D a distance. Then at step #725, the shutter is opened in accordance with the effective exposure value Ev calculated at step #640 of the flow chart shown in FIG. 19, and when a predetermined aperture value is reached, the electronic flash device ST is caused to emit flash light therefrom, whereafter the shutter is closed when a predetermined exposure is reached. After the shutter is completely closed, the microcomputer $\mu$c controls, at step #730, to retract the lens to its home position, whereafter the sequence returns to step #145 of the flow chart shown in FIG. 13. To the contrary, in case it is judged at step #710 that the flag FLF is FLF=0 and flash photographing should not be done, exposure control is executed, at step #715, in accordance with the effective exposure value Ev determined at step #650 of the flow chart shown in FIG. 19. After then, lens retracting control is executed at step #730, whereafter the sequence returns to step #145 of the flow chart shown in FIG. 13. Since the detailed sequence of operations for the photographing operation (actuation of the lens and exposure control) is not a principal subject of the present invention, only brief description thereof is given above.

Figure 20:
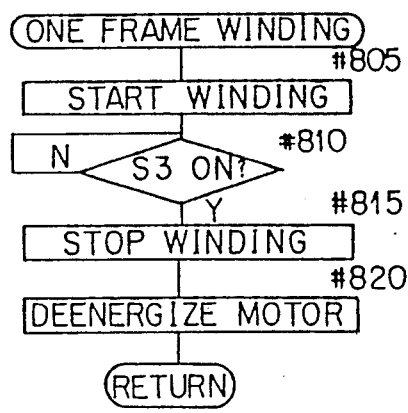
FIG. 20 is a flow chart showing a one frame winding subroutine.

Referring back to FIG. 13, after completion of the photographing operation at step #145, the sequence advances to step #150 at which the microcomputer $\mu$c executes control of winding of a film by one frame distance. Details of the control are illustrated in a flow chart of FIG. 20. Referring to FIG. 20, the microcomputer $\mu$c delivers a winding starting instruction signal at step #805 and then waits, at step #810, until the one frame switch S3 is turned on to indicate that winding of the film by one frame distance is completed. After the switch S3 is turned on to change the signal to the input terminal I1 of the microcomputer $\mu$c to the "L" level, the microcomputer $\mu$c controls, at step #820, to stop the film winding motor and, after such stopping, deenergize the motor. After then, the sequence returns to step #150 of the flow chart shown in FIG. 13. Referring back again to FIG. 13, after completion of the control of winding of the film by one frame distance at step #150, the microcomputer $\mu$c waits at step #155 until the photographing preparing switch S1 is turned off, that is, until the photographing operation for a frame of the film is completed. Then, after the switch S1 is turned on to change the signal at the input terminal I3 of the microcomputer $\mu$c to the "H" level, the output terminal OT4 of the microcomputer $\mu$c is changed to the "L" level to turn the power supply transistor Tr1 off at step #160, whereafter the sequence advances to step #165 at which the sequence advances to step #20 of the flow chart shown in FIG. 12. On the other hand, in case the photographing preparing switch S1 is off at step #130 when the release button S2 is off and accordingly photographing should not be done at step #125, the sequence advances directly to step #160 at which the power supply transistor Tr1 is turned off and then to step #165 at which the sequence advances to step #20 as described above.

Figure 23:
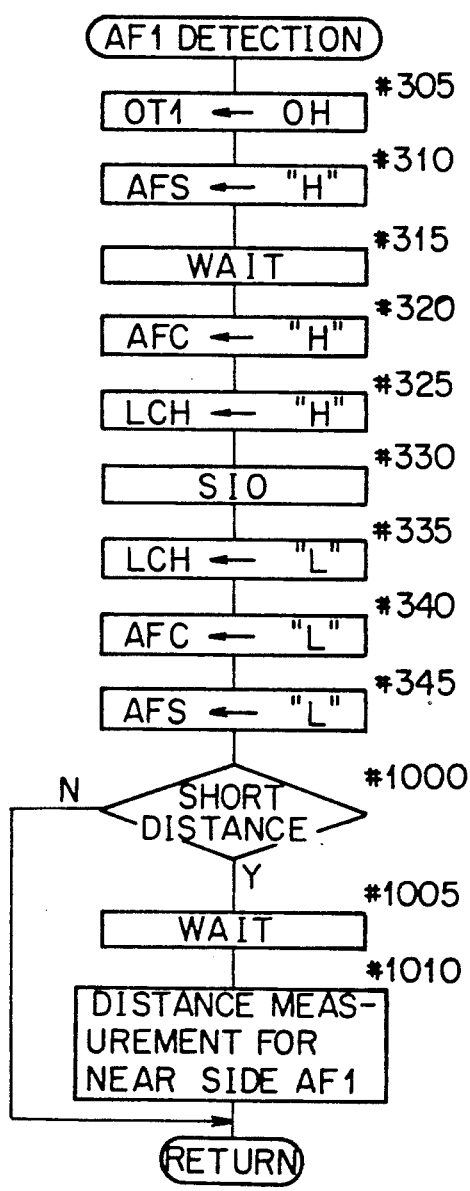
FIG. 23 is a flow chart showing an alternative distance measuring subroutine.

While in the embodiment described above a range finding area for a short distance is set only at a central portion of a field, similar effects may be attained alternatively if it is judged with respect to each range finding area whether or not a measured distance value indicates that the range finding area is located near the camera and then, in case the judgement is in the affirmative, a pair of light receiving elements for a short distance are set and a distance detecting operation is performed again using the thus set light receiving elements. FIG. 23 is a flow chart illustrating such an alternative operation as described just above. Referring to FIG. 23, the flow chart shown is a modification to the flow chart shown in FIG. 14, and the steps #305 to #345 are common to those of the flow chart of FIG. 14. Thus, the flow chart shown in FIG. 23 is entered at each of the steps #55, #65, #75, #85 and #95 of the flow chart shown in FIG. 13 in order to detect a distance with respect to each of the range finding areas AF1 to AF5. After a distance with respect to a range finding area is detected through the steps #305 to #345, it is judged at step #1000 whether or not the measured distance value thus detected indicates that the range finding area is located at a short distance, and in case the judgement is in the negative, the sequence directly returns to an original step from which the subroutine shown in FIG. 23 has been entered. On the contrary where the judgment is in the affirmative and accordingly the range finding area is located at a short distance, the sequence advances to step #1005 at which the microcomputer $\mu$c waits for a predetermined interval of time until the capacitor C2 is charged to the predetermined voltage to enable a subsequent distance measuring operation. Then at step #1010, the microcomputer $\mu$c executes a similar distance detecting operation to that illustrated in FIG. 14 (i.e., steps #305 to #345) but using a different set of light receiving elements for a short distance. In particular, at a step corresponding to the step #305, an appropriate one of values 6H, 7H, 8H and 9H is delivered from the output terminal OT1 of the microcomputer $\mu$c, and consequently, an appropriate light emitting element and an appropriate set of light receiving elements are selected in accordance with Table 4 below.

TABLE 4

| Range Finding Area | Light Emitting Element | Light Receiving Element | OT1 Signal |
|---|---|---|---|
| AF1 | LED1 | SPC2(b) SPC3(b') | 6H |
| AF2 | LED2 | SPC3(c) SPC4(c') | 7H |
| AF3 | LED3 | SPC4(d) SPC5(d') | 5H |
| AF4 | LED4 | SPC5(e) SPC6(e') | 8H |

Since the base length cannot be increased any more (no further light receiving element exists rightwardly in FIG. 1), no such changing of light receiving elements can be available for the range finding area AF5. Thus, a distance for a short distance area is detected through the step #1010. After completion of the operation at step #1010, the sequence returns to the original step from which the subroutine shown in FIG. 23 has been entered.

It is to be noted here that where the subroutine shown in FIG. 23 is employed in place of the subroutine shown in FIG. 14, the steps #100 and #105 of the subroutine shown in FIG. 13 should be omitted to avoid duplication. It is also to be noted that a light measuring range here is same as that for the light measuring range AF6 (AF3 as switched to the near side).

Having now fully described the invention, it will be apparent to one of ordinary skill in the art that many changes and modifications can be made thereto without departing from the spirit and scope of the invention as set forth herein.

What is claimed is:

1. A distance measuring system for a camera, comprising:
   light emitting means for emitting light twice to an object at a same area in an angle of view to be photographed by said camera;
   light receiving means including three receiving elements arranged in a line along a base length for receiving reflected light from the object to individually output received light signals;
   ratio calculating means including selecting means for selecting received light signals outputted from a first pair of adjacent ones of said three receiving elements when said light emitting means emits light for the first time and for selecting received light signals outputted from a second pair of adjacent ones of said three receiving elements when said light emitting means emits light for the second time, and means responsive to selection of received light signals for taking a ratio between the selected received light signals;
   distance calculating means for calculating distances based on the ratios obtained by said ratio calculating means;
   distance determining means for determining a distance based on the two distances calculated by said distance calculating means; and
   lens driving means for driving a taking lens of said camera based on the distance determined by said distance determining means.

2. A distance measuring system as claimed in claim 1, wherein said light emitting means includes a single light emitting diode.

3. A distance measuring system for measuring distance to an object with respect to a plurality of range finding areas, comprising:
   light emitting means for emitting light to said object;
   light receiving means having a plurality of receiving portions corresponding to said plurality of range finding areas and arranged in a line along a base length for receiving light reflected from said object and for outputting received light signals with respect to said plurality of range finding areas;
   control means for controlling said light emitting means to emit light twice to a selected one of said plurality of range finding areas during a single distance measuring operation, said control means including first means for selecting a received light signal outputted from the one of said plurality of receiving portions of said light receiving means which corresponds to the selected one of said plurality of range finding areas as a result of one of the two light emissions, and second means for selecting a received light signal outputted from a different one of said receiving portions of said light receiving means as a result of the other one of the two light emissions; and
   distance calculating means for calculating a distance based on the received light signal selected by one of said first or said second means.

4. A distance measuring system as claimed in claim 3, wherein said different one of said receiving portions of said light receiving means selected by said second control means is spaced by a greater length from said light emitting means than said one of said plurality of receiving portions of said light receiving means which corresponds to the one of said plurality of range finding areas.

5. A distance measuring system as claimed in claim 4, wherein said light emitting means includes a plurality of light emitting diodes corresponding to the plurality of range finding areas.

6. A distance measuring system as claimed in claim 5, wherein each of said plurality of receiving portions is composed of a pair of light receiving elements, and said light receiving means further includes means for calculating a ratio between output signals of the pair of light receiving elements of each of said plurality of receiving portions to output a ratio signal as the received light signal.

7. A distance measuring system, comprising:
   light emitting means for emitting light;
   light receiving means having a plurality of light receiving portions arranged in a line along a base length and corresponding to a plurality of range finding areas, each of said light receiving portions being composed of a pair of light receiving elements for outputting a pair of received light signals;
   ratio calculating means for calculating a ratio between a pair of received light signals outputted from each of the pairs of light receiving elements of said light receiving means to output a ratio signal;
   control means for controlling said light emitting means to emit light successively to the range finding areas;
   distance calculating means for successively receiving the ratio signals for said light receiving portions of said light receiving means corresponding to the range finding areas and for calculating distances with respect to the individual range finding areas based on the received ratio signals; and distance determining means for determining a distance based on the distances obtained with respect to the range finding areas.

8. A distance measuring system as claimed in claim 7, wherein said ratio calculating means includes selecting means for selecting one of pairs of received light signals delivered from said light receiving portions of said light receiving means, and means including a circuit for taking a ratio between received light signals of the pair selected by said selecting means.

9. A distance measuring system as claimed in claim 8, wherein said light emitting means includes a plurality of light emitting elements corresponding to the range finding areas, and said control means controls said light emitting means such that one of said light emitting elements which corresponds to one of the range finding areas with respect to which a distance is to be measured may emit light.

10. A distance measuring system as claimed in claim 7, wherein one of a pair of light receiving elements of each of said light receiving portions of said light receiving means is common with one of a pair of light receiving elements of a light receiving portion next to the light receiving portion.

11. A distance measuring system, comprising:

light emitting means for emitting light;

light receiving means having a plurality of light receiving portions corresponding to a plurality of range finding areas, each of said light receiving portions being composed of a pair of light receiving elements for outputting a pair of received light signals;

ratio calculating means including selecting means for selecting one of pairs of received light signals corresponding to one of the range finding areas with respect to which a distance is to be measured, and means for taking a ratio between received light signals of the pair selected by said selecting means;

control means for controlling said light emitting means to emit light successively to the range finding areas;

distance calculating means for successively receiving the ratio signals from said light receiving portions of said light receiving means corresponding to the range finding areas and for calculating distances with respect to the individual range finding areas based on the received ratio signals; and distance determining means for determining a distance based on the distances obtained with respect to the range finding areas.

12. A distance measuring system, comprising:

control means for controlling a range finding means to make a first distance measurement of an object within a first predetermined distance range with respect to said distance measuring system and to output a first measured distance signal;

judging means for judging whether or not said range finding means should make a second distance measurement based on a result of the first distance measurement;

said control means controlling said range finding means to make a second distance measurement of an object within a second predetermined distance range with respect to said distance measuring system and to output a second measured distance signal when said judging means judges that said range finding means should make said second distance measurement; and distance calculating means for calculating a distance based on the first or second measured distance signal.

13. A distance measuring system as claimed in claim 12, wherein said judging means judges that said second range finding means should make a distance measurement when the result of a distance measurement by said first range finding means indicates that the distance measured by said first range finding means is within a nearer distance range portion within said first predetermined distance range with respect to said distance measuring system.

14. A distance measuring system as claimed in claim 13, wherein the second predetermined distance range is a nearest distance range portion in said first predetermined distance range with respect to said distance measuring system.

15. A distance measuring system as claimed in claim 12, wherein said first and second range finding means include a common light emitting means and different light receiving means arranged in a line along a base length.

16. A distance measuring system, comprising:

range finding means for measuring a distance of an object;

control means for controlling said range finding means to first measure a distance within a first distance range with respect to each of a plurality of range finding areas and to thereafter measure a distance of an object within a second distance range to said distance measuring system with respect to one of the plurality of range finding areas; and distance determining means for determining a distance based on the distances measured with respect to each of the plurality of range finding areas and with respect to one of the plurality of range finding areas.

17. A distance measuring system as claimed in claim 16, wherein the predetermined range finding area is a central one of the plurality of range finding areas with respect to which said first range finding means makes distance measurements.

18. A distance measuring system as claimed in claim 16, wherein said first and second range finding means include a triangular measuring system.

19. A distance measuring system as claimed in claim 18, wherein said triangular measuring system includes a light emitting means and a light receiving means.

20. A distance measuring system, comprising:

range finding means for measuring a distance with respect to each of a plurality of range finding areas;

a distance calculating means for calculating a second distance based on a plurality of distance measurements by said range finding means;

brightness measuring means for measuring a brightness of an object; and control means for controlling said brightness measuring means to measure while said range finding means is being operated.

21. A distance measuring system as claimed in claim 20, wherein said range finding means includes a light emitting means and a capacitor serving as an energy source for said light emitting means, said light emitting means being supplied with energy from said capacitor to emit light each time a distance measurement is effected by said range finding means, and wherein said brightness measuring means includes a double integral-type analog to digital converter and wherein said control means controls the brightness measuring means to measure during charging said capacitor.

22. A distance measuring system, comprising:
range finding means for measuring a distance of an object;
range finding repeating means for controlling said range finding means to operate predetermined repeated times;
distance calculating means for calculating a second distance based on the distances measured predetermined repeated times by said range finding means;
brightness measuring means for measuring a brightness of said object;
brightness measuring repeating means for controlling said brightness measuring means to operate predetermined repeated times;
brightness measuring calculating means for calculating a second brightness based on the brightness measured predetermined repeated times by said brightness measuring means; and
control means for controlling said range finding means and said brightness measuring means to alternately operate said range finding repeating means and said brightness measuring repeating means.

23. A distance measuring system as claimed in claim 22, wherein said range finding means includes a light emitting means and a capacitor serving as an energy source for said light emitting means, said light emitting means being supplied with energy from said capacitor to emit light each time a distance measurement is effected by said range finding means, wherein said brightness measuring means includes a double integral-type analog to digital converter, and wherein said control means controls the brightness measuring means to measure during charging said capacitor.

* * * * *